United States Patent [19]
Schanze

[11] Patent Number: 6,055,639
[45] Date of Patent: Apr. 25, 2000

[54] SYNCHRONOUS MESSAGE CONTROL SYSTEM IN A KERBEROS DOMAIN

[75] Inventor: Martin Lee Schanze, Mission Viejo, Calif.

[73] Assignee: Unisys Corporation, Blue Bell, Pa.

[21] Appl. No.: 08/948,840

[22] Filed: Oct. 10, 1997

[51] Int. Cl.⁷ .................................................... H04L 9/12
[52] U.S. Cl. .......................................................... 713/201
[58] Field of Search ................................... 713/201, 200; 709/227, 229, 304, 236

[56] References Cited

U.S. PATENT DOCUMENTS

| | | | |
|---|---|---|---|
| 5,481,720 | 1/1996 | Loucks et al. | 713/201 |
| 5,544,322 | 8/1996 | Cheng et al. | 709/229 |
| 5,553,242 | 9/1996 | Russell et al. | 709/227 |
| 5,617,570 | 4/1997 | Russell et al. | 709/304 |
| 5,805,823 | 9/1998 | Seitz | 709/236 |

*Primary Examiner*—Tod R. Swann
*Assistant Examiner*—Matthew Smithers
*Attorney, Agent, or Firm*—Alfred W. Kozak; Mark T. Staar; Steven B. Samuels

[57] ABSTRACT

A network wherein multiple client-terminals can communicate with a client-server and Kerberos Server. A client may request service from a Kerberos Server, via a Kerberos Support Library, which can be handled as a synchronous message response from the Kerberos Server and Kerberos Support Library, such that the program managing the response does not need to access any other programs for the handling and transmitting of the synchronous message response back to the client. Thus an unsolicited message is returned to the client-terminal without any interference to the operator's usage of the client-terminal during the interim.

4 Claims, 13 Drawing Sheets

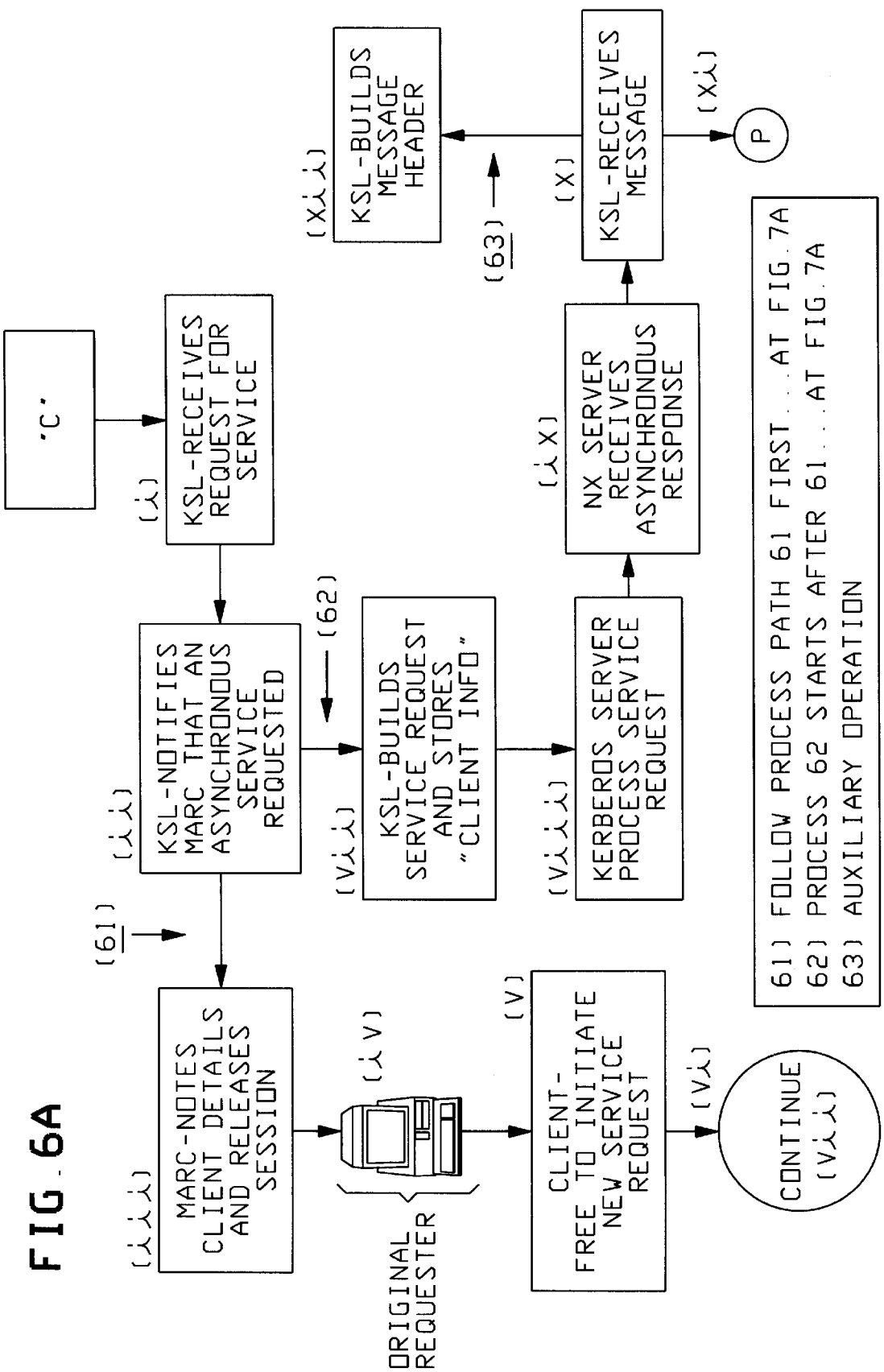

SYNCHRONOUS MESSAGE CONTROL SYSTEM IN A KERBEROS DOMAIN

CROSS-REFERENCES TO RELATED APPLICATIONS

This disclosure is related to the following applications, entitled:

MESSAGE CONTROL SYSTEM FOR MANAGING MESSAGE RESPONSE IN A KERBEROS ENVIRONMENT, U.S. Pat. No. 6,003,136, now allowed; and ASYNCHRONOUS MESSAGE SYSTEM FOR MENU ASSISTED RESOURCE CONTROL PROGRAM, U.S. Pat. No. 6,009,175, now allowed, each of which are incorporated herein by reference. Also incorporated by reference is a related co-pending application, U.S. Ser. No. 09/026,746, entitled "EXPEDITED MESSAGE CONTROL FOR SYNCHRONOUS RESPONSE IN A KERBEROS DOMAIN."

FIELD OF THE INVENTION

This disclosure relates to the control and handling of client requests for service to a Kerberos Server and delivery of an appropriate synchronous message response.

BACKGROUND OF THE INVENTION

In recent years, great emphasis has been. provided and applied in regard to ensuring the security of communications in networks of clients and servers. Cryptographic systems have been developed for maintaining privacy of information that is transmitted across various communication channels. One type of cryptographic system often used is designated as a "symmetric crypto-system". These symmetric cryptosystems generally utilize electronic keys and can be somewhat compared to physical security systems. An example of this would be the network where a message holding box has a single locking mechanism which has a single keyhole. Then one key holder can use his key to open the box and place a message in the box and then relock the box. Subsequently then, a second holder (who has an identical copy of the key) then unlocks the box and retrieves the message. Here the term "symmetric" indicates the situation where both users have "identical keys".

In computer systems which are designated as a "symmetric crypto-system", the system requires that there be (i) an encryption function E; (ii) a decryption function D; and (iii) a shared secret key, K. In this situation, the "K" key is a unique string of data bits which apply to the encryption and decryption functions.

One particular example of the encipherment/decipherment function is the National Bureau of Standards Data Encryption Standard designated as DES. Another example is the Fast Encipherment Algorithm (FEAL). In this situation, in order to transmit a message (M) with privacy, the sender must compute a ciphertext designated "C" on the basis where C equals E (M,K). In this situation, the recipient terminal, upon receipt of the ciphertext C, then computes the message M equal to D (C,K), enabling the recipient terminal to recover the message "M".

Again here, K is the shared secret-key which functions such that a unauthorized terminal who copies the ciphertext C, but who does not know the shared secret key K, will find himself unable to recover the message M. Here, the security is based on maintaining the secrecy of the key K.

In addition to the above-mentioned "symmetric cryptosystems" there are also systems designated as "Asymmetric Crypto-Systems" often designated as Public Key Crypto-Systems which provide other ways of encrypting information. They differ from symmetric systems, for example, in the physical sense, such that the message box has one lock, but also has two non-identical keys associated with it. Here, either key can be used to unlock the box to retrieve the message which was locked in the box by the other key. This type of system could be made to operate such that keys must be used in a "particular sequence", such that the box can be locked with one key and only then unlocked with the other key. This asymmetric type crypto-system is often designated as a "RSA" system which refers to the names of authors Rivest, Shamir, Adleman (RSA) in a paper described in pages 120–126 of Vol. 21 of CACM (Communications of the Association for Computing Machinery), published in February 1978.

In systems designated as Public Key Electronic Crypto-Systems, each operating entity or terminal has a private key "d", which is only known to that particular entity or terminal. There is also a public key, "eN" which is publicly known. Here, once a message is encrypted with a user's public key, it can only be decrypted using that particular user's "private key", d.

Conversely, if the message is encrypted with the user's "private key". It can only be decrypted using that user's "public key".

A Kerberos Security System is being used as a developing standard for authenticating network users and is often used primarily in the UNIX community where it is useful because it functions in a multi-vendor network and does not transmit passwords over the network.

Kerberos operates to authenticate users, that is to say, it determines if a user is a valid user. It does not provide other security services such as audit trails. Kerberos authentication is based on "passwords" and does not involve physical location or smart cards.

To implement Kerberos in the system, each computer in a network must run Kerberos software. Kerberos works by granting a "ticket" which ticket is honored by all the network computers that are running Kerberos protocol. The tickets are encrypted, so passwords never go over the network in "clear text" and the users do not need to enter their password when accessing a different computer.

Since there is often a need to run Kerberos on every single computer in a network, this sometimes presents a problem for potential users. Considerable effort and time may be involved in porting Kerberos to each different hardware platform in the network.

Kerberos users tended to be large networks which were furnished with extended expertise. Since such resources are not generally available to smaller networks, it is sometimes a problem to make it available to such smaller networks which cannot justify the cost and expense.

The primary benefit of Kerberos is that it prevents a password from being transmitted over the network.

Kerberos networks are involved with the type of systems designated as "symmetric crypto-systems" discussed above. One type of symmetric crypto system is called the "Kerberos Authentication System". This type of system was discussed and published on the Internet by J. T. Kohl and D. C. Neuman in an article entitled "The Kerberos Network Authentication Service" which was published Sep. 19, 1993 on the Internet RFC 1510. Kerberos uses symmetric key crypto-systems as a primitive and often uses the Data Encryption Standard (DES) as a inter-operability standard. Kerberos systems have been adopted as the basis for security service by the Open Software Foundations (OSF), Distributed Computing Environment (DCE). Kerberos was designed to provide authentication and key-exchange, but was not particularly designed to provide digital signatures.

Thus, networks require systems and methods for securing communications which provide a way for one user to authenticate itself to another user and additionally, these often require systems for securing communications which, facilitate digital signatures being placed on a message to provide for non-repudiation.

Kerberized environments involve the transmittal of messages, for example, from a server to a client which leads to several major problems in these networks. One problem involves the inordinate period of time that a client or a server is required to wait after requesting a response to a Kerberos command. As a result of waiting for a response, this causes the controlling software program or process, to wait so that any other clients or servers in the network requesting a service would also have to wait.

Another type of problem involved in Kerberos networks is that there is no existing method of returning unsolicited messages, generated synchronously or asynchronously from a Kerberos Server to a client or other server.

The presently described system functions to overcome those situations where commands, requiring a Kerberos Server's synchronous response, to a client request, are not generated in a timely fashion. Thus, the present system and method permits the utilization of a client-terminal and programs, in an associated client-server and Kerberos Server, to continue to handle service requests.

Additionally, the presently described system and method provides a mechanism for establishing communication paths to handle the disposition of unsolicited messages coming from a Kerberos Server to various clients in the system.

Several other types of problems and inadequacies often arose in operating with Kerberos domains. Often, the user would enter a command and then be presented by a query of whether or not the command works or does not work. This is handled in the present situation whereby the system returns a synchronous response informing the user if that particular command was successful.

Another problem often posed was the situation where the user would interrogate the Kerberos Server settings and the status for certain network connected clients and find that this was not possible to be accomplished. This was resolved by enabling a synchronous message routing to allow network connected clients to obtain current status and settings from the Kerberos Server.

SUMMARY OF THE INVENTION

A method is established for enabling a requesting client terminal to receive a synchronous response message from a Kerberos Server in a network wherein multiple client terminals communicate with a client server which has a Kerberos Support Library (KSL) which also communicates with an associated Kerberos Server.

A client terminal initiates a synchronous command request to the Kerberos Server in the network via a specialized program designated COMS (Communication Management System Program) which will communicate to another program designated MARC (Menu Assisted Resource Control Program). MARC will transmit a synchronous command request to the Kerberos Support Library (KSL) for a message response. The Kerberos Support Library will respond to COMS (without need to connect to the Kerberos Server) whence COMS will enable MARC to use COMS to respond to the client terminal.

GLOSSARY OF TERMS

Figure 1:
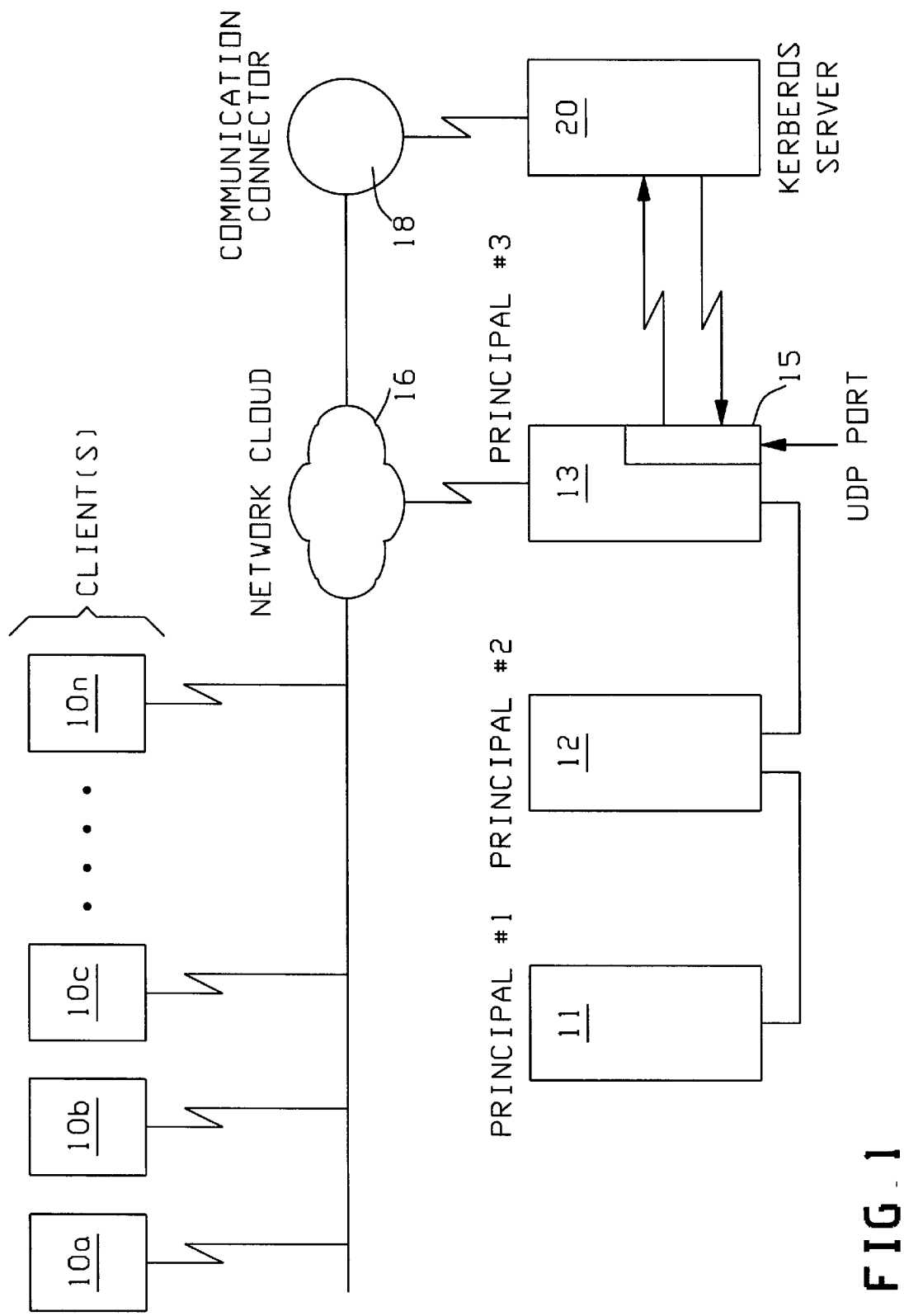
FIG. 1 is a general overview of the Kerberos domain involving various clients and servers in a network.

1. UDP (User Datagram Protocol)—This is a communication protocol which is used as one of a number of "standard" methods of communicating information across a network.
   An extension of this is a UDP Port; a communication port which is used for UDP communications.
2. HLCN (Host LAN Connection)—The ClearPath NX HLCN product provides the implementation of NetBIOS and IPX protocols that permit terminal services to the ClearPath NX Server over Netware.
3. MCS (Message Control System)—Programs (with special privileges) on ClearPath NX systems that control the flow of messages between terminals, application programs, and the operating system (MCP). Reference Unisys "A Series DCALGOL Programming Reference Manual," May 1989/Form 5014574.380 (Release Mark 3.8.0)
4. COMS—(Communications Management System)—is a Unisys Message Control System that supports processing for a network on the Unisys ClearPath NX Server. Reference: Unisys A Series Communications Management System (COMS) Operations Guide. May 1989 1154523.380
5. MARC (Menu Assisted Resource Control)—The MARC window provides access to the MARC program. One of the functions of the MARC program is to handle network and session control and provide requested information and system messages for COMS. The MARC window (program) is always in operation in COMS. Reference Unisys "A Series Menu-Assisted Resource Control (MARC)" Unisys Operations Guide, February 1992/Form #8600 0404-100. (Release Mark 4.0.0)

6. GSS-API (Generic Security Service)—Application Program Interface)—This is the draft-standard interface application programs use to access available security services generically. The actual security services are provided by underlying mechanisms. Possible implementation choices for mechanisms include, but are not limited to Kerberos, Secure Sockets, DASS. The goal is that applications do not require any knowledge about the underlying mechanism in order to use it. Reference: GSS-API Version 2 on A Series Functional Design Specification 95132/3 Version C. Published Jul. 23, 1996 by Unisys Corp.

6a) DASS—A security mechanism using the X.509 capabilities.

6b) Secure Sockets—A security mechanism that has growing popularity on the Internet.

7. HLCNTS (Host LAN Connection Terminal Service)—ClearPath NX terminal service product predicated on the underlying HLCN product. HLCNTS provides connection based communications between clients using Netware based IPX/NetBIOS and the ClearPath NX. Reference: Unisys Host LAN Connection Terminal Services (HLCNTS) 0.1.4/Version D, Jun. 26, 1995.

8. Asynchronous Message (Definition #1)—A message (data in display or non-display format) which is generated by a concurrent independent process yet requiring occasional synchronization and cooperation of other process(es). Definition #2:—A message (data in display or non-display format) which was generated in an environment where asynchronism of processes exists. Reference: "*An Introduction to Operating Systems*" by Harvey M. Deitel (Addison-Wesley Publishing Company) First Edition 1984.

9. Synchronous Message #1—A message (data in display or non-display format) which is generated by a concurrent process dependent upon its own environment. #2—A message (data in display or non-display format) which was generated in an environment where synchronism of a single process exists. Reference: "*An Introduction to Operating Systems*" by Harvey M. Deitel (Addison-Wesley Publishing Company) First Edition 1984.

10. Kerberos Support Library (KSL)—This library provides functions to support the various Kerberos message exchange protocols and a number of user administration functions. It closely interacts with the GSS Library and other system software. Reference: A-RAM Kerberos Support Library—Functional Specification 93187/3 Version C. Published Mar. 6, 1997 by Unisys Corp.

11. Stack Capsulate—A "snapshot" or "outline" of a non-detailed process environment. For explanatory purposes, it is a mid-level overview of the processing environment highlighting events in a sequential order.

12. Dialog No. (Dialog Number)—MARC establishes Dialog(s) Numbers on behalf of a client requesting services. A Dialog Number is the internal/external number associated with a client which is accessing (using) MARC.

13. NX MCP Environment—Unisys Corp. sells computers under the name "ClearPath". For explanatory purposes, the architecture is designated as the ClearPath NX. The ClearPath NX is packaged with both MCP environments (this is the Unisys A Series E mode processor) and the "NT" Server side. The NX MCP Environment pertains specifically to the E mode processor side of the architecture exclusive of the NT Server side.

14. Unsolicited Message—A message (data in display or non-display format) which is generated by a concurrent process that is received by a concurrent independent (different) process.

15. Transaction ID i.e., (TRANSACTION ID)—The internal name given to a uniquely generated number passed from MARC to the KSL (Kerberos Support Library) identifying a clients service request. This number will then be attached by the KSL and in turn sent back to MARC such that MARC may route an asynchronous message back to the appropriate client (originator).

16. Networking Host Software—Generalized term for software residing and functioning on the ClearPath NX which provides network communication capability. Software such as the Networking Support Library, Telnet, TCP/IP, HLCN, etc. would be "known" or "thought of" as Networking Host Software.

17. IPX—A communications protocol "Internetwork Packet Exchange".

18. COMS MSG Format—A message consistent with an agreed upon format that COMS (Item #4 of Glossary) recognizes. A message containing a COMS header (information in an agreed upon location and format) and the message portion so that COMS may route the message.

19. Key Distribution Center—Portion of the software residing on the Kerberos Server which processes tasks related to Key(s). A key is a signal code which can be used to access a message which would not ordinarily be accessible.

20. K-Admin—Kerberos Administration/Software on the Kerberos Server responsible for configuration and user administration of the Kerberos Server.

21. DCWRITE—A function construct in DCALGOL used to construct messages and pass messages to an MCS. (Glossary Item #3) Reference: A Series DCALGOL Programming Reference Manual form #5014574.380 (May 1989) Page 3–13 and Section 5. Published by Unisys Corporation.

22. NetWare—An operating system developed by Novell, Inc. The NetWare operating system runs in a file server and controls system resources and information processing on the entire network or Internetwork. Reference: "Concepts" Novell NetWare 3.12, July 1993. Part Number 100-001715-001

23. Station Transfer—ClearPath NX terminal service product predicated on an underlying Station Transfer Protocol. Reference: Unisys "A Series Station Transfer Chances for A-EAM," Functional Design Specification 95145/3 Version A, Nov. 2, 1995

24. GSS-API Library—ClearPath NX support library providing services as defined in Glossary Item #6 above.

25. UserData—constitutes a miniature data management system that maintains a database called SYSTEM/USERDATAFILE. The database defines valid usercodes and contains various types of data concerning the user population on a particular ClearPath NX Server.

26. Encryption Library—The DES (Data Encryption Standard) Support Library. The DES Encryption Support Library provides the various encryption algorithms which are needed by the Kerberos protocols. According to [RFC1510] any Kerberos implementation must, at a minimum, support the following encryption algorithm: - - - DES/CBC/MD5 (DES encryption, using cipher block chaining mode with an MD5 checksum).

27. Directives Interface—A Directive Command is a feature of MARC which enables a system to create new commands and make them available to MARC users. To implement a 'true' directive, the function of these commands is defined by writing a library of ALGOL procedures (within the KSL in this case). The DIRECTIVE command is used in MARC to associate a command name with the procedure. Thereafter, users can use the new command in the same way as they use any other MARC command. Reference Unisys "*A-EAM Kerberos Directive Commands,*" Functional Design, 95057/3 Version B, Aug. 17, 1995.

28. Master Control Program (MCP)—Unisys reference to "*Burroughs Large Systems MCP Manual*"—Release 3.5; May, 1985/Copyright 1985, Burroughs Corporation, Detroit, Mich. 48232.

29. Event—An "Event" provides a means to synchronize simultaneously executing processes. An event can be used either to indicate the completion of an activity (this would be how Kerberos is using it, i.e., on the Kerberos Server; and EVENT is changed to a "Happened" state and the KSL is made aware of this change, in this case the response has been formed) or as an interlock between participating programs over the use of a shared resource. From Unisys "*A Series ALGOL Programming Reference Manual Volume* 1: *Basic Implementation*" Release Mark 3.7/July, 1987; Form# 1169844.

GLOSSARY

Kerberos Security Administrative Commands

1. All commands are entered by the client with the Kerberos prefix of "KRB".
2. Commands:
   (a) CLOCKSKEW: This command allows the ClearPath NX security administrator to set the allowable clock-skew used by the Kerberos protocol to accommodate variations in clocks on remote systems, when verifying a ticket. The default clock-skew value is 300 seconds. (Synchronous).
   (b) DEBUG: The DEBUG command does not require special privilege for a user to inquire on the DEBUG option that is currently being set. DEBUG is used to obtain information about KADMIN request(s), procedure entries and exits, etc. This is used as a diagnostic tool. (Synchronous).
   (c) DESTROY: When invoked the command writes zeros to the specified credentials cache containing the tickets and thereby destroying the tickets. The cache is removed. (Synchronous).
   (d) INIT: Before Kerberos can grant tickets for access to the services of other principals in a network, the user must first log in to Kerberos to obtain a set of credentials consisting of a Ticket Granting Ticket (TGT) and a session key (provided the user has not already logged on to Kerberos and had the TGT forwarded to the ClearPath NX Server). On the ClearPath NX Server, the KRB INIT command provides the means for allowing a user to log into Kerberos to obtain the TGT. (Asynchronous).
   (e) KeyTab: This command allows an appropriately privileged user to inquire the application principals in the Key Table file on the ClearPath NX Server, but not the values of the keys associated with the application principals. (Synchronous).
   (f) LIST: Displays for a user the primary principal and Kerberos tickets held in the credentials cache. (Synchronous).
   (g) LOAD: Allows an appropriately privileged user to load new configuration files into memory immediately or wait until the next Kerberos initialization. (By default, files are loaded at initialization). (Synchronous).
   (h) PASSWORD: Allows the client to change his or her password. (Asynchronous).
   (i) PID: Permits the client to inquire on his or her own Principal_ID given his/her ClearPath NX usercode. (Asynchronous).
   (j) REALM: Returns the realm name for the local host. (Synchronous).
   (l) REPLAY: Allows the appropriately privileged user to inquire, enable, or disable the REPLAY detection option. (Synchronous).

GENERAL OVERVIEW

Figure 8:
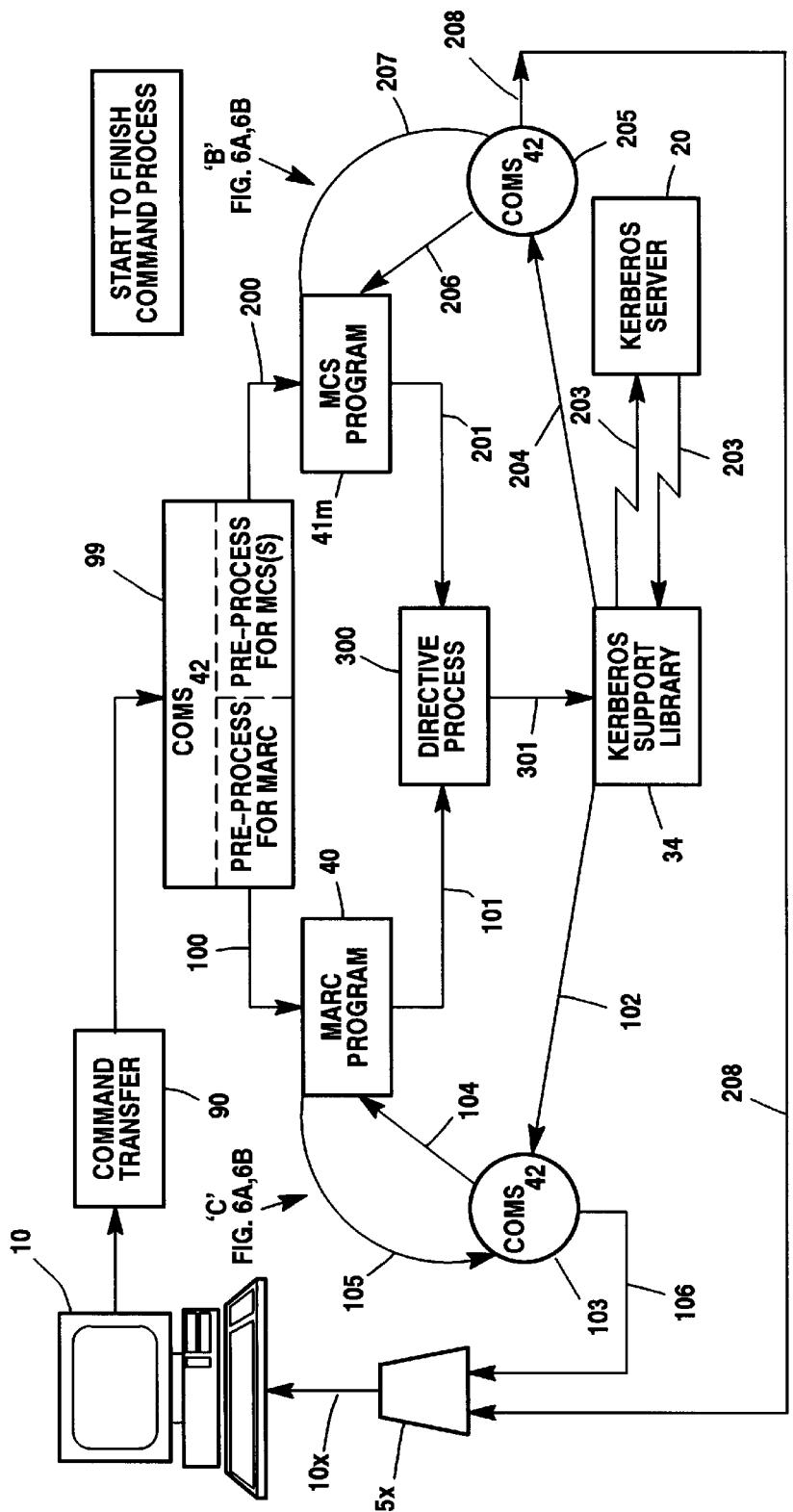
FIG. 8 is a generalized overview of various channels for synchronous and asynchronous message response management.

A general overview of various aspects of the Kerberos domain messaging systems is shown in FIG. 8. This figure illustrates various sequences used for both synchronous message handling and for asynchronous message handling.

As seen in FIG. 8, the client 10 initiates a command transfer 90 to the COMS program 99 (Communications Management System Program). Here the COMS program partitions into two aspects, one of which is the pre-processing for the Menu Assisted Resource Control Program (MARC) and the pre-processing for the Message Control Systems Programs.

One leg at marker 100 shows the use of the Menu Assisted Resource Control Program 40, while the other leg 200 shows the use of the message control system program 41*m*.

Now, following the leg 100 marker, the MARC program 40 is invoked which program initiates via Marker 101, the directives processes 300. The directives processes 300 is a software mechanism in MARC to identify and process a "directive command".

The directives process then operates at marker 301 to contact the Kerberos Support Library 34. Now assuming that the system is operating on a synchronous message basis, the Kerberos Support Library 34 will operate at marker 202 requesting service of COMS on behalf of the MARC program 40. During this service request all previous process within this environment will wait for the service response from the Kerberos Server 20. Following marker 203 back to the Kerberos Support Library 34, the response is returned. The Kerberos Support Library 34 will operate at marker 102 to send the Kerberos response to the COMS program 42 at location 103, which then at marker 104, will contact the MARC program 40 which will then use the marker 105 to reconnect to the COMS program 42 at location 103 with the processed message response which at marker 106 will be conveyed to the multiplexer 5*x*, and thence at marker 10*x* conveyed back to the client 10.

Now on the other hand, if this had been an "asynchronous" message response, it would follow that the directives process 300 would at marker 301 connect to the Kerberos Support Library 34 which then, at marker 202, would contact the Kerberos Server 20 which would then respond at marker 203 back to the Kerberos Support Library 34. As an asynchronous process during the transfer of control at marker 202 to the Kerberos Server 20, all previous process in the process environment are notified, specifically the MARC program 40 via marker 102 through COMS 42 at Marker 103 via marker 104 so that the response to its service request will be returned at a later time. Continuing wtih the original request, the Kerberos Server 20 now having generated the response passes the response via marker 203 to the Kerberos Support Library 34. The Kerberos Support Library 34 would then at marker 102, connect to the COMS program 42 at Marker 103 which program would, via marker 104, connect to the MARC program 40, which would then at marker 105, communicate back to the COMS program 42 at Marker 103, which then at marker 106 would convey the message response to multiplexer 5x, which would then, using marker 10x, convey the Kerberos Message Response to the client 10.

Now, in FIG. 8 looking on the Message Control Systems (MCS) operations originating from the COMS program 42 at marker 99, it will be seen that at marker 200 the preprocessing will initiate the MCS program 41m, which then at marker 201 will connect to the directives process 300.

The directives process operates via marker 301 to contact the Kerberos Support Library 34.

Now assuming that the command is a "synchronous command", then the Kerberos Support Library will operate at marker 202 requesting service on behalf of the MARC program 40. During this service request all previous process within this environment will wait for the service response from the Kerberos Server 20. Following marker 203 back to the Kerberos Support Library 34, the response is returned. The Kerberos Support Library 34 will operate at marker 204 to send the Kerberos response over to the COMS program 205, which then at marker 208 will convey the Kerberos message response to the multiplexer 5x, which at marker 10x will convey the synchronous message response back to the client 10.

On the other hand, if the command involved were a "asynchronous command", then the MCS program 41m would connect at marker 201 to the directives processes 300, which via marker 301 would contact the Kerberos Support Library 34. As an asynchronous process during the transfer of control at marker 202 to the Kerberos Server 20, all previous processes in the process environment are notified (specifically the MCS program 41m via marker 204 through COMS 42 at Marker 205 via marker 206) that the response to its service request will be returned at a later time. Continuing with the original request, the Kerberos Server 20 now having generated the response, passes the response via marker 203 to the Kerberos Support Library 34.

Thence, using the asynchronous command situation, the Kerberos Support Library 34 would operate at marker 204 over to communicate with the COMS program 42 at Marker 205, which then at marker 206, would contact the MCS program 41m. Thence, the MCS program at marker 207 would reconnect to the COMS program 42 at Marker 205 which then would at marker 208, connect to the multiplexer 5x in order to return the asynchronous message command at marker 10x back to the client 10.

At the bottom of FIG. 8 there is seen a number of notations and references to certain of the markers in FIG. 8. Thus, the marker 301 represents a Kerberos command to be responded to by either the Kerberos Support Library 34, or the Kerberos Server 20.

Figure 9A:
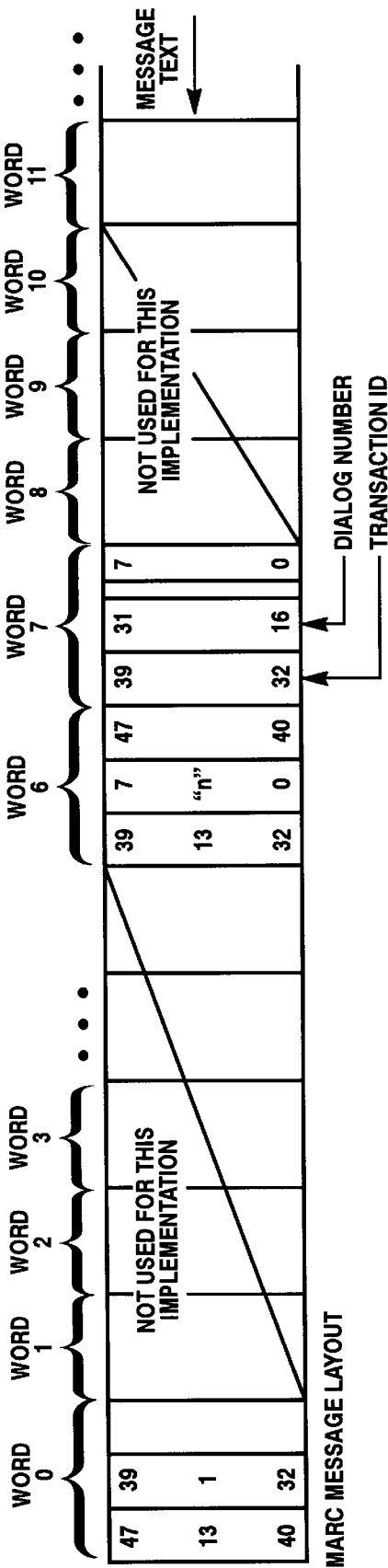
FIGS. 9A, 9B, 9C, 9D show message array format examples for developing a response message.

The marker 102 represents the command response for the MARC message layout, designated in the format of FIG. 9A.

Figure 9B:
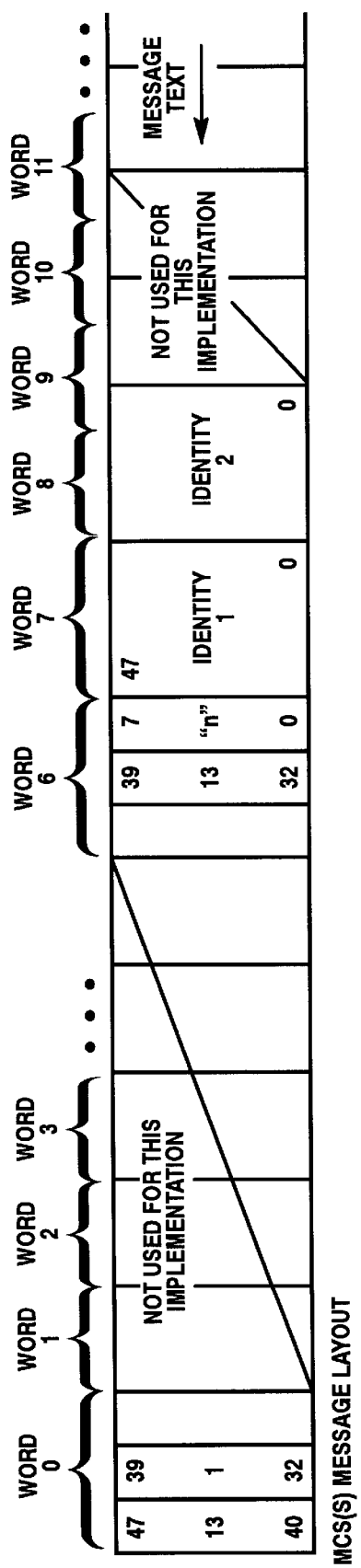

FIG. 9B represents a format of the command response in relationship to the marker 204 of FIG. 8.

Figures 9C, 9D:
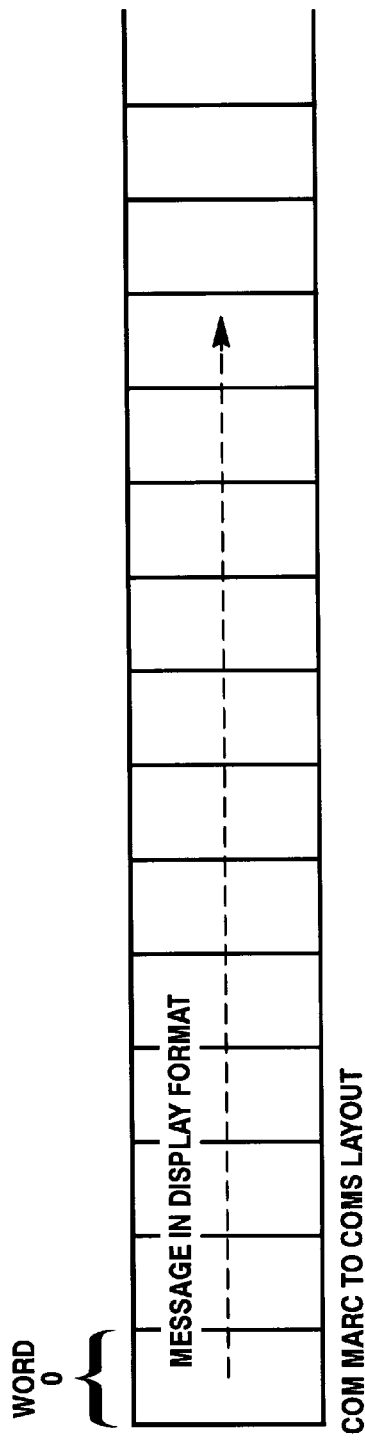

The format of FIG. 9C is the message display format showing the layout for MARC over to COMS with reference to markers 105 and 207 of FIG. 8.

FIG. 9D shows the full word format as a typical reference where each word has 48 data bits and 3 leading control bits, which correspond to marker 208 of FIG. 8.

The message layout for the MARC (Menu Assisted Resource Control Program) as seen in FIG. 9A, indicates a word zero, then words 1, 2 and 3 which are not used, followed by words 6 through 11 in which words 6 and 7 are used and words 8, 9 and 10 are not used. In FIG. 9A, the bits 32–39 represent a number, such as for example, 1, while the bits 40 through 47 represent another number, such as number 13. Further in FIG. 9A, the word 6 indicates how bits zero through 7 represent a number "n", while bits 32–39 represent another number, for example, 13. Further, the bits 32–46 of word 7 represent the "transaction ID", while the bits 16–31 of word 7 represent the dialog number. Then word 11 onward represents the message text.

FIG. 9B represents the message control systems (MCS's message layouts) whereby the words 1, 2, 3 . . . 5 and words 9 and 10 are not used in this layout. However, word zero shows bits 32–39 representing a particular number, such as 1, and bits 40–47 representing particular numbers such as 13. Then, word 6 has bits zero through 7 representing a number "n", and bits 32 through 39 representing a number, such as 13. The bits in word 7 of zero to 47 represent "Identity 1". Then in FIG. 8, the bits 0 through 47 represent "Identity 2". Then words 11 onward represent the message text.

FIG. 9C represents a message in display format, which is used in communicating from the MARC program to the COMS program.

FIG. 9D is an illustration of the 48 bits for the full word format, where each word has 48 data bits, and includes 3 leading control bits.

Figure 6B:
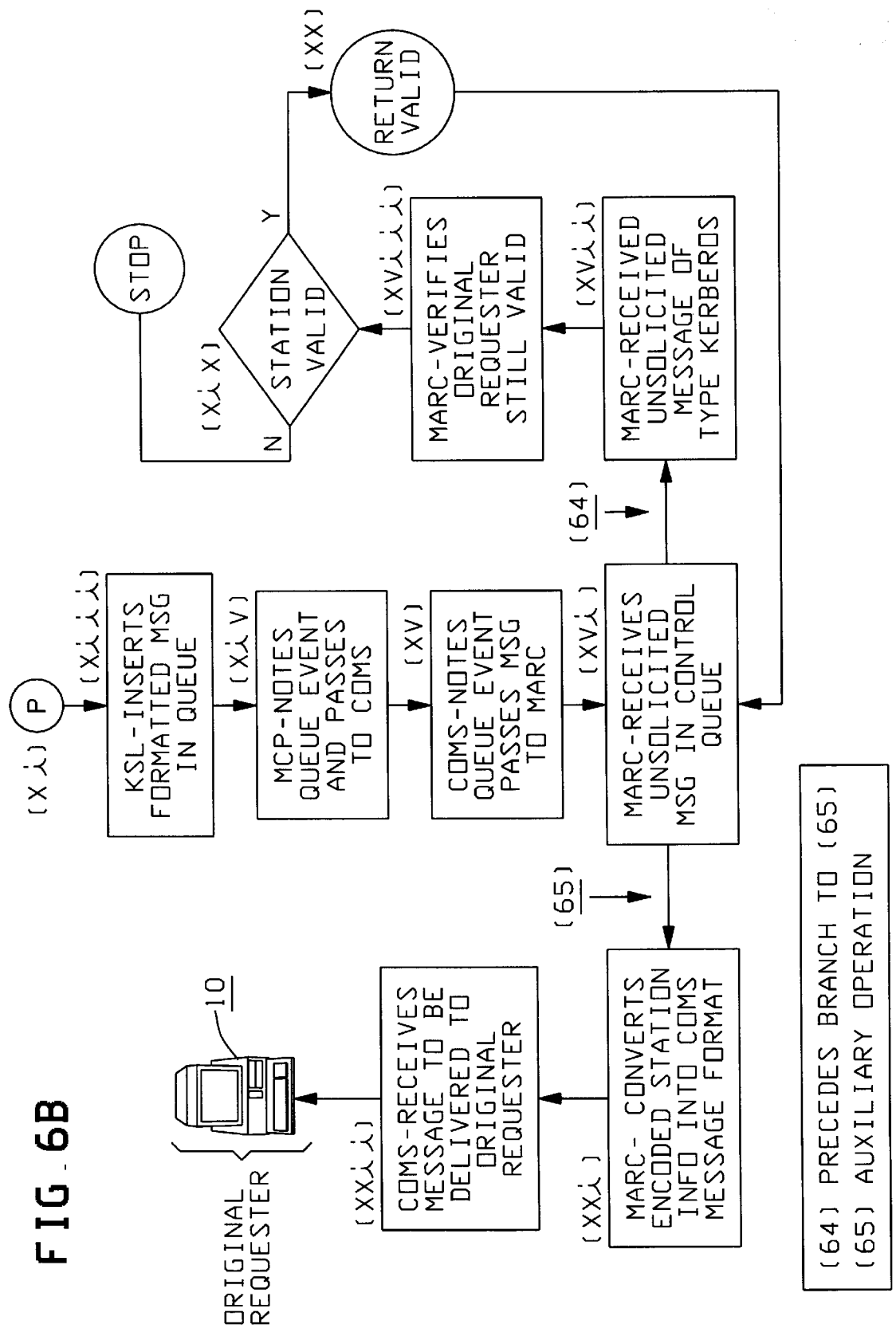
FIG. 6 is a flow chart illustrating the Menu Assisted Resource Control Program process involved for asynchronous message handling as shown in FIGS. 6A and 6B.

Referring to FIG. 8, it may be noted that the marker 105 is related to the sequences of FIGS. 6A and 6B which refer to the handling of asynchronous service requests from the MARC program.

Figure 4:
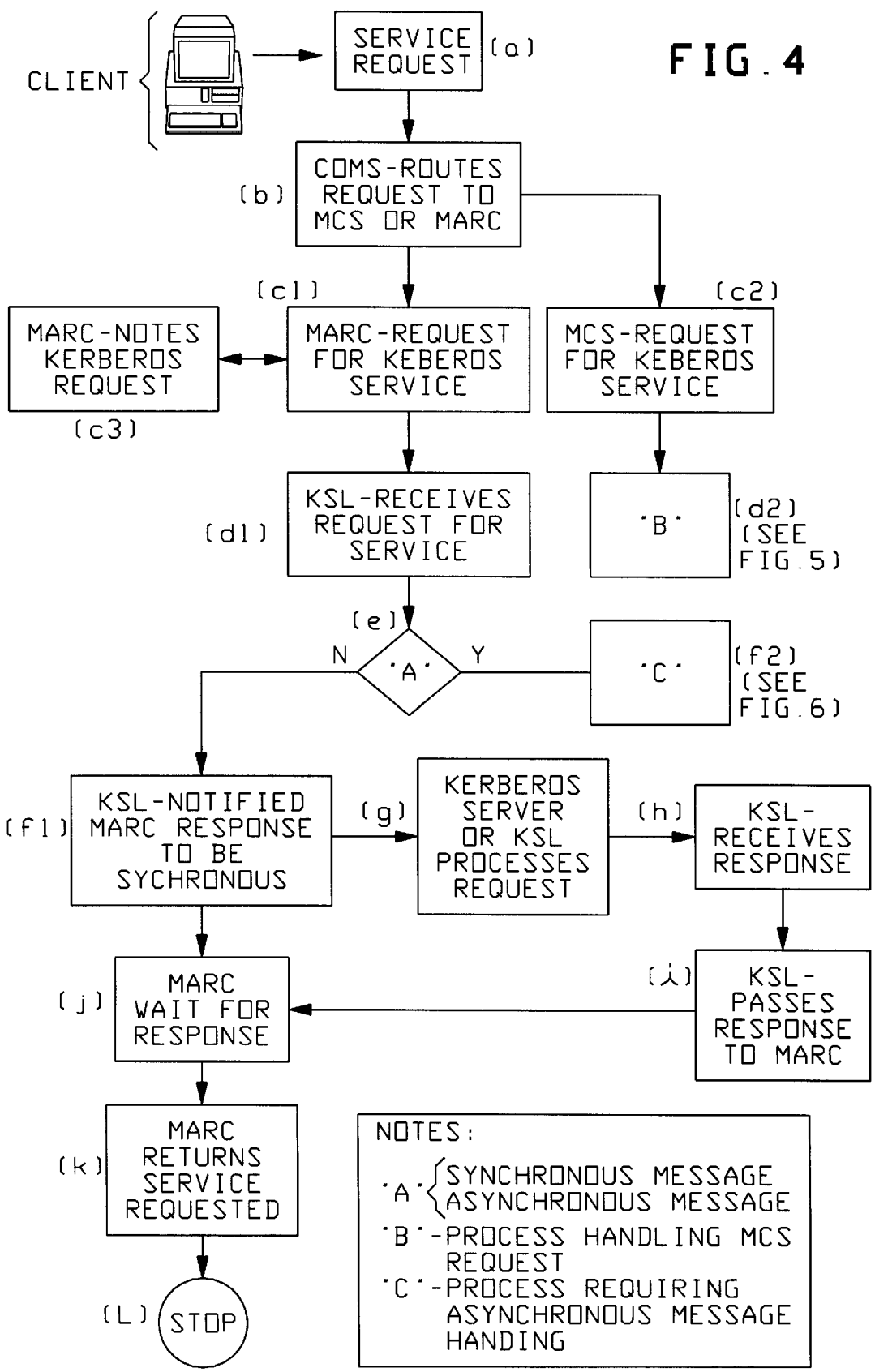
FIG. 4 is a flow chart illustrating the steps involved when a client service request seeks a response from the Kerberos server and indicating the path steps (f1) through (k) for synchronous message response.
Figure 5:
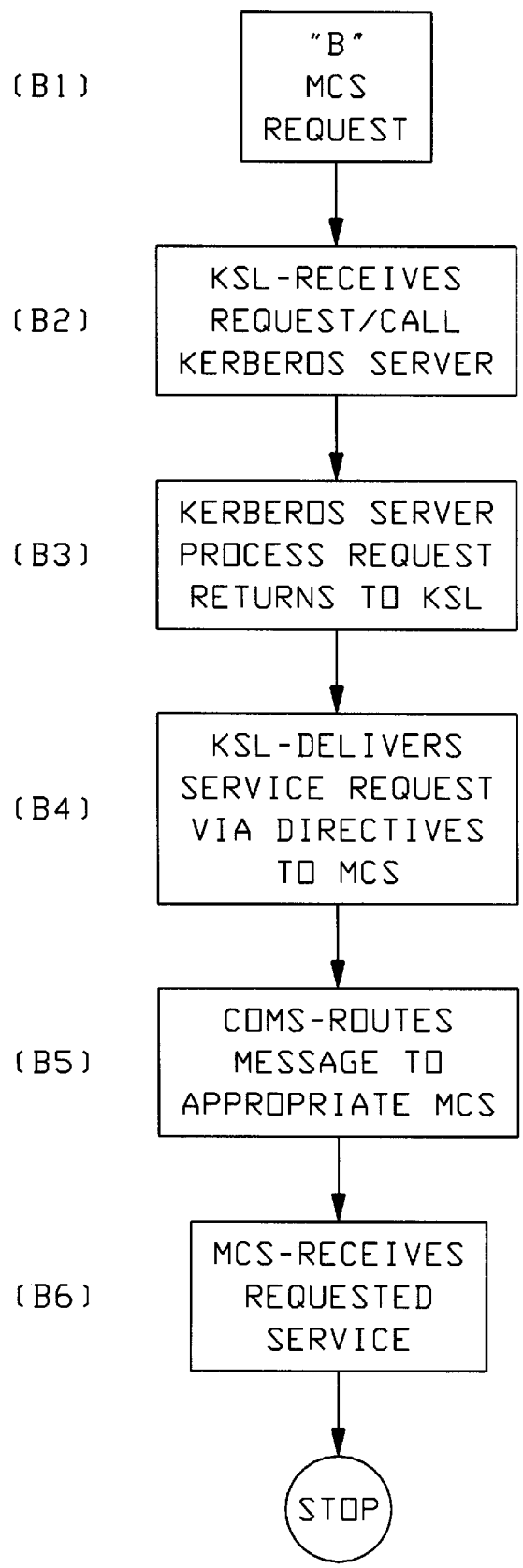
FIG. 5 is a flow chart illustrating the steps involved when the request involves a message communication system MCS.

Then again in FIG. 8, at the marker 207, this can be correlated to FIG. 5 (which is derived from FIG. 4) and which involves the processes for handling the message control system request operations.

If the message control system MCS used is that of MARC 40, this particular system uses a Transaction_ID which is shown as word 7 of the message array shown in FIG. 9A. In this case, the routing of an asynchronous response message is done by COMS 42 through the MARC 40 program as is indicated in FIGS. 6A, 6B for the sequence "C", of FIG. 4.

On the other hand, the response message at Marker 104 may be routed in a separate channel shown in FIG. 8 through the COMS 42 over to the other MCS 41m and the queue 62 as indicated in FIG. 5 at the sequence "B".

As seen in FIG. 9A, the MARC 40 program will use the Transaction_ID and pass this back as part of its response.

The channel for other types of Message Control Systems (MCS) will use the COMS program 42 and use an MCS number instead of the Transaction_ID.

As seen in FIG. 9A, these systems can use a typical message array composed of four words, each word consisting of 48 bits. FIG. 9A shows the message array of word 0 which is used for control information, plus word 7 which provides a Transaction_ID. The MARC 40 program manages to use only the word 1 which is the Transaction_ID. However, the MCS channel (B of FIG. 5) and of FIG. 8 is capable of using words of FIG. 9A, and be expanded to use extra words. The MCS 41m has a program with a queue 62 defined with stacks shown in FIG. 10. The MCS channel does not generally have to worry about routing of the message, since there is generally a single user for that MCS program, while on the other hand, the MARC program may have a thousand users and this requires a unique Transaction_ID. The MCS system and channel (B of FIG. 5) is considerably more versatile in that it could use several words of FIG. 9A, or could use neither of these and just use an MCS number. Additionally, the MCS channel could make use of all of the extra words or even more words if required in order to handle the possibility of thousands of client users.

Thus, there are variety of channels for providing asynchronous response messages back to a client requester as seen by the above examples where the MARC program uses the Transaction_ID of word 7 of FIG. 9A, while on the other hand, the Kerberos response message may be handled on the other MCS system via COMS 42 using one word or multiple words or a combination of greater number of words to route a message to particular client users.

When non-asynchronous response messages are involved, as in the focus of this present disclosure, the "synchronous" response messages are routed as shown in FIG. 4 through steps a, b, c1, d1, e, f1, g, h, i, j, k, and L.

DESCRIPTION OF THE PREFERRED EMBODIMENT

The present system and method involves the Kerberos realm or domain which denotes a number of hosts, servers and clients connected into a single administrative domain. The general concept for modules which are hosts, servers or clients are often designated herein as "principals". The term "principal" is a term used to denote a uniquely named client or server participating in a network environment. The Kerberos realm or domain is provided with a Kerberos Server which is a host-server responsible for Kerberos security. Clients are units which may reside in attachment to the network cloud or within the network cloud. The use of the term "cloud" or the term "network cloud" is a term often proposed by the Novell Corporation and used to designate interconnections in a network.

The term "ClearPath" is used to denote a Unisys Corporation system network wherein different platforms may be connected together but are also provided with compatible communication protocols and services.

A general overview of a network designated as a Kerberos realm or Kerberos domain is shown in FIG. 1. The realm or domain involves a number of principals which may be considered digital machines and wherein these principals involve clients or servers that are participating in the domain which is under the control of a particular Kerberos server.

Thus, as seen in FIG. 1, there may be a series of clients or client-terminals designated 10a, 10b, 10c . . . 10n. These units are connected to a network cloud 16 and a communications connector 18. There are a number of unique clients or servers 11, 12, and 13 which can be designated as principals. One of the principals such as principal 13, is seen having a UDP (User Datagram Port) port 15, which connects the third principal 13 to the Kerberos Server 20. The network cloud 16 is also connected to the communication connector 18 which is then connected to the Kerberos Server 20. The UDP port 15 is an acronym for the "User Datagram Protocol" port. The network cloud 16 is a generalized interconnection element which may indicate that various clients are residing in the network cloud.

A "realm" or a "domain" may denote a number of host servers or clients and principals involved in a single administrative domain designated as a Kerberos domain. The Kerberos realm can be considered as a term for modules participating in a Kerberos domain. There can also occur a number of different realms or domains which can be interconnected and which involve another level of complexity.

FIG. 1 could also have more than one Kerberos Server connected in with various network connections. The Kerberos Servers can communicate with each other and participate as part of the domain involved.

Figure 2:
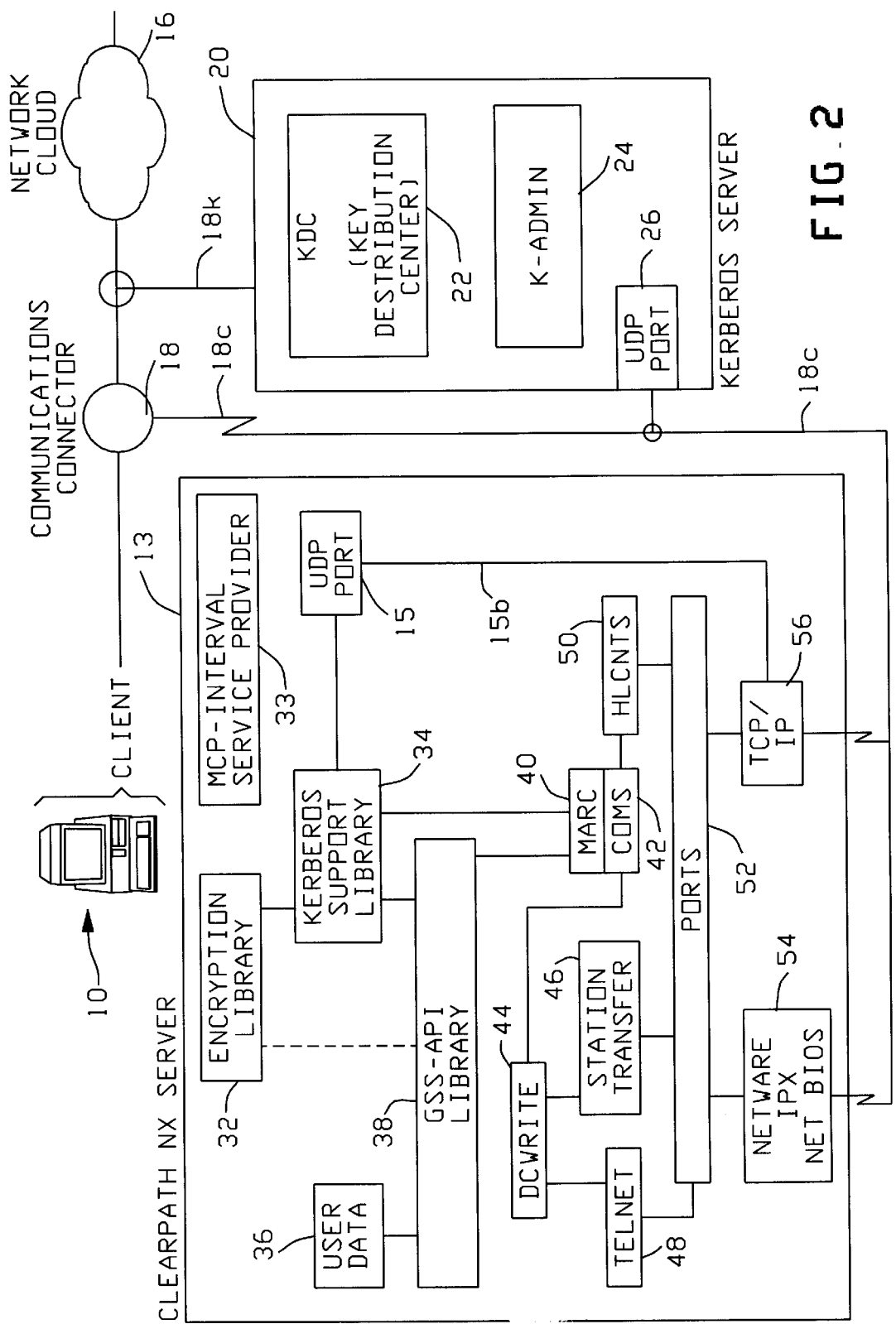
FIG. 2 is a block diagram showing the elements involved in network relationship designated as client/ClearPath/Kerberos Server.

FIG. 2 indicates the Kerberos Server network with an expanded view of the principal unit 13. Here, the client terminal 10 is connected to the communications connector 18 which enables it to communicate and operate with various aspects of the principal 13 and the Kerberos server 20.

The typical principal 13 (ClearPath NX Server) is shown with a number of the basic functional elements. The bus 18c from the communications connector 18 is seen connected to the UDP port 26 of the Kerberos server 20. The bus further provides connection to the principal 13 via the IPX/NetBIOS (NetWare process) 54 and the TCP/IP unit 56. The hardware IPX/NetBIOS provides similar functions to TCP/IP 56. IPX is an Internetwork Packet Exchange Protocol developed by Novell that sends data packets to requested destinations, i.e. workstations, servers, etc. NetBIOS and IPX provide the session, transport and networking layers of a protocol stack which handles communication between dissimilar systems.

The TCP/IP 56 (Transmission Control Protocol/Internet Protocol is a protocol for Internetwork communication between dissimilar systems.

The Ports module 52 provides an interface to the Telnet Unit 48, to the station transfer unit 46 and to the HLCNTS Unit 50.

The Telnet 48 involves a package switching network that enables many different varieties of terminals and computers to exchange data.

The station transfer network 46 functions to provide the necessary protocol for information transfer.

The HLCNTS 50 is a unit which provides the function of connection and communication between Netware clients and ClearPath NX clients.

The client information or message thus enters the principal 13 through the ports 52 and talks through the Telenet 48 and station transfer unit 46, through the DC WRITE Unit 44 which calls on the program COMS 42 which is the communications management system (COMS 42). This in turn then communicates or talks to MARC 40 which is the Menu-Assisted System Resource Control program. MARC and COMS are Unisys Corp. A-Series program functions which were developed for the Unisys Corporation A-Series computer systems. When a client logs on to the A-Series systems, a call is made on the MARC 40, that is to say, the Menu-Assisted System Resource Control program. The MARC 40 will function to call on the Kerberos Support Library (KSL) 34 in order to initiate the proper security functions.

The library module 38 designated GSS-API connects the MARC program both to the Kerberos_Support Library 34 and to a user data bank 36.

The encryption library 32 is connected to service both the Kerberos Support Library 34 and the GSS-API library 38.

The GSS-API library 38 serves the function of providing interface application programs to access available security services.

Also shown is the MCP internal service provider 33 which is part of the Unisys A-Series Master Control program (MCP). This includes a queue management function module and a UDP port management module 15. The MCP Service Provider 33 connects to a series of ports and also to the Telnet 48, the HLCN 50 and the station transfer unit 46. Additionally, the MCP Service Provider 33 (FIG. 2) is also connected as seen in FIG. 3 to COMS 42 and to the MARC 40 via MCP 60 as well as the Kerberos Support Library 34.

There are several functions that are provided by the MCP 60, but the major functional concerns are those which involve the passing of an asynchronous message in addition to handling the queue management functions and management of the UDP port 15 in the principal 13. (ClearPath NX Server).

The client 10 enters his communications via the communication connector 18 and bus 18c over into the ports 52 and then talks through the Telnet unit 48 and the station transfer group 46. These units in turn call the COMS 42 which in turn talks or communicates with MARC 40 (Menu Assisted System Resource Control program). Both COMs and MARC are Unisys A-Series computer system functions described in the attached Glossary.

Figure 3:
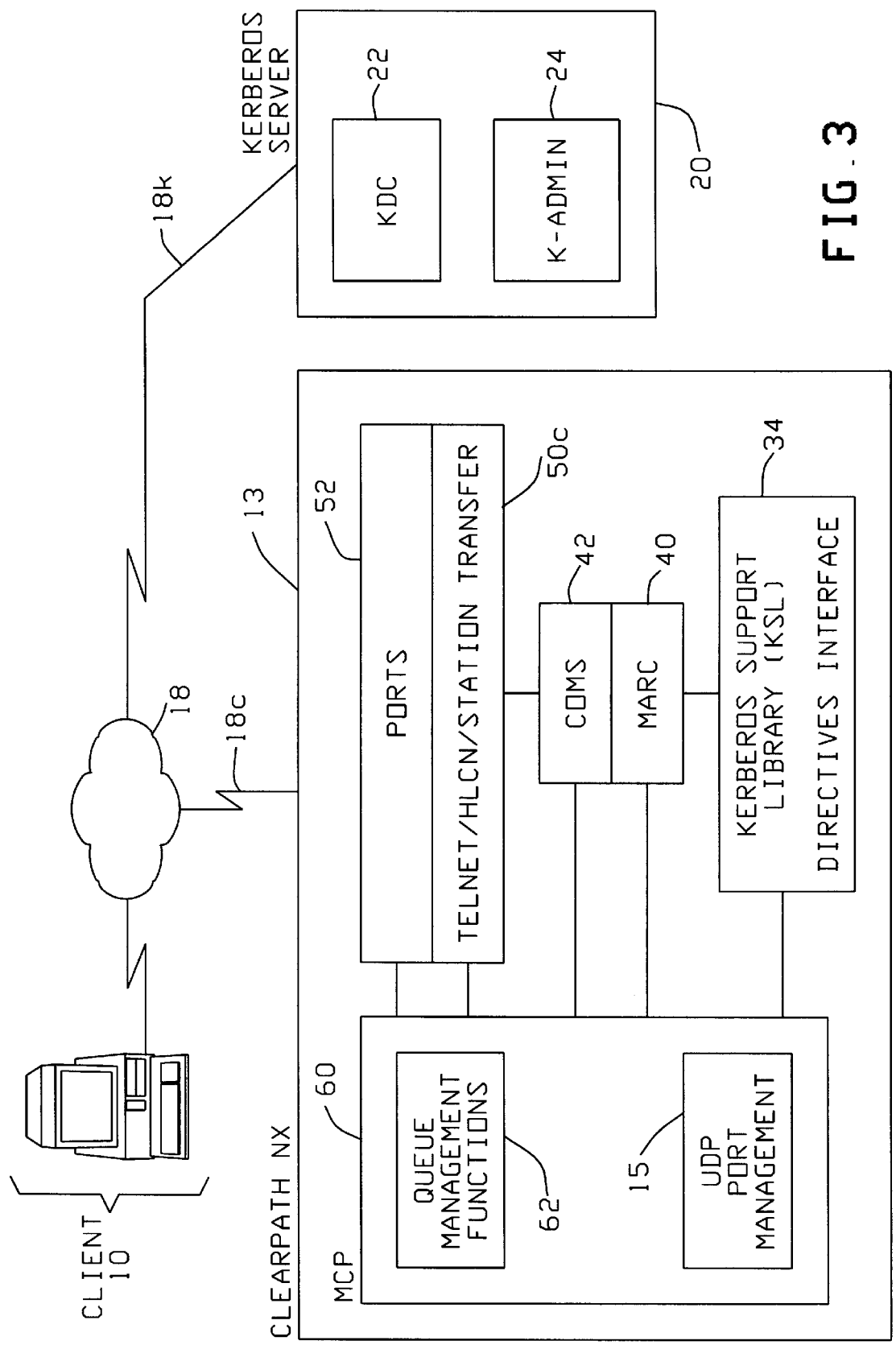
FIG. 3 is a drawing of the elements involved in an asynchronous message model involving a Kerberized environment.

Further regarding FIGS. 2 and 3, the Kerberos Server 20 is seen to have a UDP port 26, a Kerberos administrator K-ADMIN 24 unit and a Key Distribution Center 22 (KDC).

The function of the Key Distribution Center 22 (KDC) is to act as a trusted third party authority that holds the secret keys for all the principals in a realm. The KDC provides two services designated AS and TGS. "AS denotes Authentication Service (AS): i.e., A service of KDC that verifies the authenticity of a principal. From "CyberSAFE Challenger Administrator's Guide" Version 5.2.5/April, 1995. TGS is the Ticket Granting Service.

The function of the K-ADMIN 24 is to provide a program to perform administration of a remote Kerberos principal database. TGS is the Ticket Granting Service (TGS). K-ADMIN is the part of the KDC that provides tickets when a client wants to access a server. From "CyberSAFE Challenger Administrator's Guide" Version 5.2.5/April, 1995.

The UDP port 26 functions to handle the User Datagram Protocol.

It may be noted that the UDP port 26 of the Kerberos server is provided with a communication line 18c through the TCP/IP 56 to the internal UDP port 15 (FIG. 2) of the principal 13 via bus 15b.

The two UDP ports (15 and 26) are two separate entities and reside in different machines. Each principal would have its own UDP port which then provides a special communications line to the Kerberos server, via the Kerberos server's UDP port, 26 (FIG. 2).

The principal 13 unit shown in FIG. 2 is also sometimes designated as a ClearPath NX server and describes one specific type of a principal 13.

FIG. 3 is a drawing showing the message model in a Kerberized environment. The client terminal 10 is here connected to the network connector 18 which provides a connection on bus 18k to the Kerberos server 20 and a connection on the bus 18c to the principal 13. This particular principal 13 is a specialized unit designated as the Unisys ClearPath NX. The Unisys ClearPath HMP (Heterogeneous Multiprocessing System) acts to integrate a number of platforms such as UNIX, Windows NT and Enterprise operating system environments by combining them into one platform.

Within the principal 13, FIG. 3, there is seen the port's interfaces 52 which connect to the combination unit 50c designated as Telnet/HLCN/Station Transfer. The HLCN refers to the high-level communication network. The combination module 50c then connects to the COMS 42 programs (Communications Management System) and also the MARC programs 40 (Menu Assisted Resource Control programs). Then as seen, the MARC programs connect to the Kerberos Support Library 34. Further in FIG. 3, the Master Control Program MCP 60 is seen connected to the ports 52, the combination module 50c, the COMS program 42 and the MARC program 40 and also the Kerberos Support Library 34. Each of the modules are connected to the MCP 60 (Master Control Program).

Figure 10:
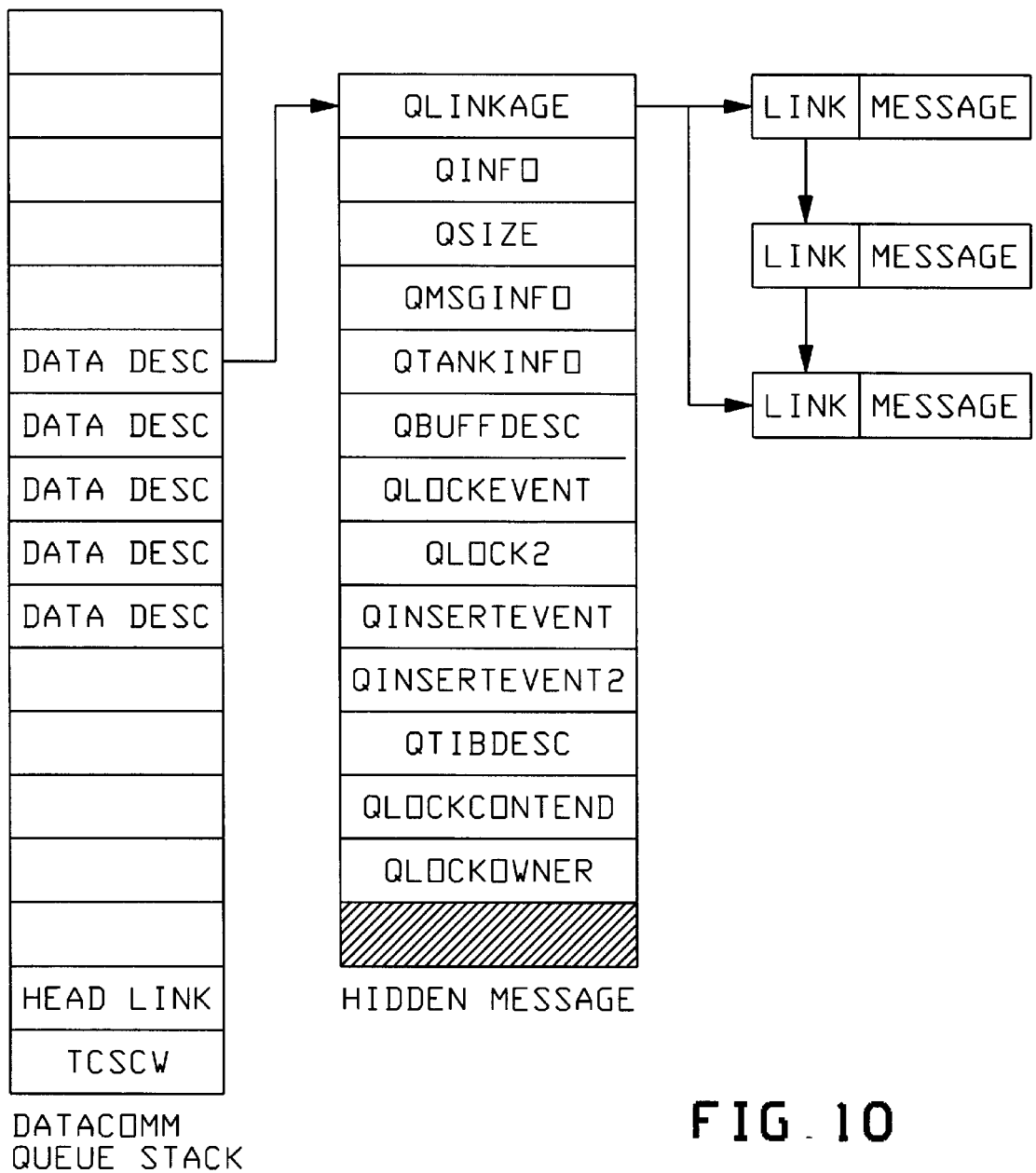
FIG. 10 is a schematic drawing of the Datacomm Queue Stack arrangement showing a linked list of available queue locations handled by the ClearPath NX Server.

The Master Control Program 60 is shown to have two modules of which the queue management function module 62 provides the function of managing an array of Queues shown in FIG. 10.

Additionally in the MCP 60, there is a UDP port management unit 64.

The Master Control Program 60 is seen in FIG. 3 to have the queue management function module 62 which involves a Queue data structure which is shown in FIG. 10. As an analogy, the queue could be thought of as a pipe. For example, considering that there is a person involved at each end of the pipe such that Person A at the left end of the pipe and Person B at the right end of the pipe. Then, at the halfway point of the pipe, there could be considered a Person C. Then for example, Person A wants to move a ball (message) from one end of the pipe to the other. Person A with the ball, then asks Person C (halfway point) to tell Person B to wake up and notice that there is a ball coming down the pipe. Person C wakes up Person B and then tells Person A to insert the ball in the Pipe for delivery. Person C then moves the ball down the pipe and tells person B that "Yes, okay the ball is now here".

In the above analogy, it can be considered that Person A is the COMS program, while Person B is any one of the various Message Control Systems (MCS), and likewise, the Person C would be analogous to the Master Control Program (MCP). This is, of course, an oversimplified version, but it illustrates the role of the COMS program to the Message Control System programs (MCS) with the Master Control Program (MCP) acting as a "overseer/controller".

Queue Management Function 62 in the MCP 60 (FIG. 3):

The MCP 60 controls the operational environment of the system by performing the functions of job selection, memory management, peripheral management, virtual memory management, dynamic sub-routine linkage, logging of errors, system utilization, and queue management. More specifically, the MCP 60 manages an array of queues. A stack called the Datacomm Queue Stack (FIG. 10) holds messages (data descriptors) and other hidden messages.

The primary function of the Datacomm Queue Stack (FIG. 10) is to hold queues which are declared in DCAL-GOL language, and to file input queues for programs with remote files. The Datacomm Queue Stack also serves as one possible communication link between the Master Control Program (MCP) and the "IR" (Independent Runner) "Controller. "IR" stands for "Independent Runner" Controller which is a separate process that gets initiated during system initialization. This Controller handles functions such as Job Control (queuing of jobs, starting and stopping of jobs, operator command processing, etc.). The MCP initiates a number of "IR's" during initialization. A common name or nomenclature in the industry today would be to "spawn a separate process".

The Datacomm Queue Stack is seen in FIG. 10. The first word in the stack contains a TOSCW (Top of Stack Control Word), while the second word contains a link.

This link is the start of a link list of available queue locations and is relative to "Word 1" of the stack. Locations in the stack that are not a part of this list are "data descriptors" that point to hidden messages. The "hidden messages" contain the head and the tail pointers of queue entries, plus attributes of the queue., such as the memory limit and the population.

As messages are placed in the Datacomm queue, (FIG. 10) the queue's memory limit may be reached. In this case, if the queue's limit is reached, a Tank Information Block (TIB) is built, then disk rows are obtained with the procedures called GETUSERDISK and the subsequent messages for the queue are TANKED, that is to say, written to disk. It may be indicated that the queue messages will not be found in memory and disk at the same time. They will either be queued on disk or in the memory, but not both.

"Word One" in the stack is the beginning of a linked list of available stack locations. Other locations will point to the "hidden message". The Tank Information Block (TIB) contains a variable number of Row Address Words. These Row Address Words point to the disk area.

Further in FIG. 2, the network cloud 16 and comconnector 18 are seen having communication busses 18k and 18c over to the Kerberos server 20 which has a Key Distribution Center Unit 22 and a Kerberos Administrator Unit 24. The Key Distribution Center Unit 22 functions to provide secret access signal codes (keys) to enable message access.

The UDP port management unit 15, FIG. 3, involves the User Datagram Protocol (UDP) which is a TCP/IP protocol that permits an application to send a message to one of several other applications running in the destination machine. The "send message" Application is responsible for providing a reliable delivery of the message.

In regard to the preliminary steps which lead up to and through a request for service so that there can be enabled the return of a synchronous or an asynchronous message in response to the client request, it will be seen that there are several assumptions which must be considered as residing in place before the detailed functioning of this model can be operative. These assumptions include:

(i) The client or principal who is requesting a service must be recognized as a valid client or a valid principal within the Kerberos realm.

(ii) By use of the word "valid", the participant must already be logged on and be recognized within the Kerberos Realm. The participant will have and be given all the rights that any other "Kerberized" client or principal might expect to have within the particular Kerberos Realm of participation.

(iii) The individual data which moves between the Unisys NX server software will not be particularly described other than to indicate that the request was "passed" to the next layer of software as appropriate. The data moves between various software packages in itself. A simple assumption will be made that data "is passed" between the software.

Briefly, a client or principal must already have been "logged on" within a Kerberos Realm and thus be provided with the same privileges as that provided any "Kerberized" client or principal's expectation of privileges.

The references made below to a client will, of course, assume that the client or principal is participating in a Kerberos Realm. As a further assumption for this description, it will be assumed that there is a person or a client operator sitting at a personal computer (PC) with Kerberos privileges.

FIG. 4 is a generalized flow chart indicating the operations occurring upon initiation of a service request by a client. The service request (a) shown in FIG. 4 comes into COMS (b) and COMS will view this as a request to MARC or to an MCS (Message Communication System) as seen in FIG. 8. The COMS program at (b) FIG. 4, will indicate that this was a request which was either a MARC request or a MCS request which is respectively shown at block (c1) and block (c2), which is the MCS request.

At position (b) of FIG. 4, where the COMS program routes the request to the MCS or the MARC, the term "routes" or the term "passes" in this instance implies that a request or a message is being moved via a queue (queuing structure) from one software stack to another software stack. This move, via a queue, is accomplished by transferring the request or message data from one stack's environment, to another stack's environment (FIG. 10) by passing a "data descriptor" which points to an area in memory where the data can be found. The management of this function is provided by the MCP 60. This likewise applies to position (i) of FIG. 4 which indicates that the Kerberos Support Library 34 passes the response via queue to the MARC program, 40.

Now referring to position (k) of FIG. 4 which indicates that the "MARC" program returns the service requested, the term "returns" implies the use of a queue for communicating both through and to the COMS program which is an ancillary process occurring each time that MARC communicates outside of its stack environment. The MCP 60 provides low-level queue management functions with COMS providing the higher-level queue management functions.

It is understood that when a client has made a service request, the client is communicating over the FIG. 3 communication bus 18c, then through the TCP/IP protocol 56 (FIG. 2) in order to access the COMS program 42.

Now taking the leg (of FIG. 4) shown at (c1) which is the MARC-request for Kerberos service, here there is provided a specialized process where the MARC program requests service from the Kerberos Support Library (KSL) 34 at (d1). Once the Kerberos Support Library receives a request for service, then a decision tree ("A") at position (e) of FIG. 4, is shown as decision tree "A" which raises the question of - - - is this going to be a "asynchronous message" (yes, Y) or is this going to be a "synchronous" message (no, N).

If the answer is "no" (N), that is to say, it is not an asynchronous message but merely an ordinary synchronous message, then this can be handled normally in the next block (f1) where the Kerberos Support Library 34 notifies MARC 40 that the response is to be "synchronous".

Then two operations are presented for execution at (f1) (FIG. 4) at this time. The system will let MARC know that it is waiting for response at (j), or otherwise at (g) the Kerberos server (or Kerberos Support Library) is going to go ahead and process this request. Alternately, there is the factor that this request can be serviced locally by KSL 34. This is shown in the block at element (g) which indicates the statement that the Kerberos Server (20) or the KSL Library (34) is processing the request. This means that the service can be accomplished via the Kerberos Server 20 or locally on the Kerberos Support Library 34. In the event that it is on the Kerberos Server 20, the system will then receive a response back from the Kerberos Server and then the Kerberos Support Library will pass that response on to MARC at step (i). This is shown at blocks (h) and (i) after which the response is sent to the MARC program at the (j) block of FIG. 4.

On this particular synchronous message path, it is expected that the response will occur within milliseconds.

Thus, when MARC at position (k) returns the service requested, the client 10 will be informed and the program will stop at (L), in order to end the process.

The term "service" here means that a request (a Kerberos command) has been made. This request for service is the processing of the Kerberos command. An example of a service request would be:

(a) Client wants to change his/her Kerberos password;

(b) From MARC the client enters:
 KRB PASSWORD <old password> <new password> <new password>

(c) Upon entering this command, the client workstation would receive the message as follows:
 Your KRB command is being processed. The response to this command will be placed in your system messages queue. You will be notified when your request has been serviced.

After an indeterminate period of time, the client workstation will receive a message:
 You have a message in your system messages queue.

When the client examines his/her system messages queue, the following message(s) could be displayed.
 Your password has been successfully changed.
or
 Your password has not been changed. <Error reason>

Again referring to FIG. 4 and observing the decision tree at (e) where the block "A" on the decision tree takes the "yes" path "Y" to indicate the "asynchronous request. The "yes" (Y) branch goes to block (f2) which indicates a separate process "C" which involves the processing of asynchronous messages and the handling of these messages. This involves a separate sequence (via process "C") which is shown in FIGS. 6 (A,B) and 7 (A,B).

Referring to FIG. 4 and proceeding from step (b) on the leg where the request is routed to the MCS (rather than to MARC) as indicated at block (c2). This is a MCS (Message Control Management System program) for Kerberos service which then evolves to block designated (d2) which indicates a process "B" which is subsequently shown and discussed in FIG. 5.

It may be noted that in FIG. 4, referring to the "synchronous" message passing branch "N" (No) at decision block (e), that the Kerberos Support Library 34 notifies (f1) the system that the MARC response was to be "synchronous" and then this is passed on to the Kerberos Server 20 or the Kerberos Support Library 34g which then receives the response. Then the Kerberos Support Library passes the response back to MARC at position (j) where MARC was waiting for the response after which at step (k) the service requested was returned by MARC to the client 10, so that at (L) the process came to a stop.

The channel on FIG. 4 which goes from block location (b) over to block location (c2) involves an MCS-request for Kerberos service. This then involves the process block "B" which is designated at location (d2) and is discussed hereinafter in regard to FIG. 5 (Process "B").

FIG. 5 will indicate a series of flowchart steps labeled B1, B2 . . . B6. At position B1, the MCS request is generated and fed at B2 to the Kerberos Support Library 34 (FIG. 3) which receives the request and calls the Kerberos Server 20. Then at location B3, the Kerberos Server 20 will process the request and return it back to the Kerberos Support Library (KSL 34).

At step B4, the Kerberos Support Library delivers the service request via directives over to the MCS where upon, at step B5, the COMS process 40 routes the message to the appropriate MCS. Thereafter at step B6, the MCS receives the requested service, at which time this process cycle is brought to an ending, after notifying client 10.

The transition of the message (data) between B5 and B6 is accomplished via a queue. The Message Control Systems (MCS) will communicate outside their environment (stack) by using queues. In this instance, when the COMS program receives a message from the Kerberos Server Library 34, it forwards the message to the appropriate Message Control System (MCS) by placing the message into a queue array. Both the MCS and the COMS programs "know" about the existence of the queue and operate to monitor it by means of what is called an "Event". The Message Control System (MCS) is waiting for an "Event" to "happen" which will then wake up the process MCS and will extract the information (data) which it now has a visibility to. The "Event" handling, the moving of data from one environment to the other is controlled by the MCP 60.

FIG. 6 is a flowchart comprising FIGS. 6A and 6B illustrating the steps involved in the handling of an "asynchronous service" request from the MARC processes 40. This block involves the "C" block which was indicated in FIG. 4, at position (f2).

Operational Processes for Block Process "C" (FIGS. 6A, 6B) Asynchronous Service Request from MARC:

(1) A user-operator residing at a client work station 10 requests a service via a Kerberos command using the MARC processes. (a, b, c1, d1, e, f2, of FIG. 4).

(2) This request is processed at the client work station 10.

(3) The client work station 10 forwards this request to the appropriate Unisys ClearPath NX Server 13 (FIGS. 2,3) via the client's functional transport mechanism. For example, this might be Net BIOS over the IPX or over the HLCN, the Telnet or Station Transfer Unit, etc. of FIG. 3.

(4) Regardless of which one of these transport mechanisms is used, the request is received by the Unisys NX Server 13 and all the network processing will occur such that the service request is received at the appropriate networking host software level via elements 46, 48, 50, FIG. 2, whose software functions to communicate with PC based terminal emulators.

(5) The networking host software passes this request to the COMS 42 for distribution (at position b of FIG. 4). Networking software (46, 48, 50, 52) on the NX Server 13 takes the message and constructs additional levels of protocol such as transport, session, and networking used to route messages on a network.

(6) COMS upon receiving this request (b), (FIG. 4) validates that the MCS request is valid. In this particular case, this particular request is to be processed by MARC 40, via (c1) (FIG. 4). As such the COMS(b) will strip header information intended for its use and then add header information intended to direct a request to MARC 40(c1) and the information to help MARC with the internal processing.

(7) MARC 40 receives the service request and notes that the request is a Kerberos command (c1, FIG. 4). The processing of Kerberos commands is handled outside of the MARC environment via the directives portion of the Kerberos Support Library (KSL) 34 (FIG. 2).

(8) MARC 40 then calling the directive's interface, passes the Kerberos command to the Kerberos Support Library 34, FIG. 3 (KSL) for processing.

(9) The KSL 34 receives the request (d1, FIG. 4) to process the Kerberos command. This will be seen to correlate to step (i) of FIG. 6A).

(10) The Kerberos Server Support Library 34 scans the Kerberos command to determine if the response to the command is to be returned synchronously or asynchronously (position (e) of FIG. 4A), to the original requester which correlates to step (ii) of FIG. 6A. The assumption will now be made that all further operations will refer to "asynchronous" responses.

(11) The Kerberos Support Library 34 determines of step (ii) that the response is to be asynchronous (Y=yes). At this stage, the KSL 34 must obtain additional information from the immediate requester (MARC 40) about the originator. The KSL must also inform MARC the response will be returned asynchronously. FIG. 4 indicates the block "C" at position (f2) which indicates the subsequent sequences which will be described in FIGS. 6A, 6B and 7A, 7B. The following steps 12 through 34 provide an initial generalized summary of these actions.

(12) The Kerberos Support Library 34 requests the client-originator information and builds a request to be sent to the Kerberos Server 20. In addition, it builds a message (in clear text form for display) which message can be used or discarded by the originator. The message states that the response to the Kerberos command which was entered will be returned asynchronously" as an unsolicited message.

(13) MARC 40, having been notified that the response to its request will be returned asynchronously, notes the dialog number of the specific user who has entered the Kerberos command.

(14) MARC assigns a "TRANSACTION_ID" (transaction number) for this request and then stores this along with the MARC dialog number.

(15) MARC, ignoring now the KSL-generated clear text message, then builds a message for the originator and sends the message.

(16) MARC releases the session (iii of FIG. 6A) which has been waiting for a response. As a result, the originator is now free to perform other tasks (v of FIG. 6A).

(17) MARC forwards the TRANSACTION_ID over to the KSL 34 (Kerberos Support Library) which has been waiting for this information.

(18) The Kerberos Support Library (KSL 34) sends a request to the Kerberos Server 20 requesting service by performing a Write request over to the UDP port 26 (FIG. 2) (vii of FIG. 6A).

(19) The Kerberos Server 20 detects activity in the UDP port 26 and then Reads the request (vii of FIG. 6A).

(20) The Kerberos Server 20 then performs the service. After an indeterminate amount of time, the Kerberos Server 20 with the response formatted, writes to the UDP port 15 of the ClearPath NX Server (FIG. 2) which is then detected by the KSL 34.

(21) The Kerberos Support Library (KSL 34) performs a Read on the UDP port 15 and obtains a response.

(22) The KSL 34 matches control information returned by the Kerberos Server 20 and builds a response constructing an appropriate header, together with the stored TRANSACTION_ID.

(23) The KSL 34 calls an export procedure in the master control program (MCP internal provider 33, FIG. 2) which then delivers a message from the KSL 34 to COMS 42 via an intercom queue. This intercom queue is located in FIG. 3 within the queue management function block 62. Its function and layout is further shown in FIG. 10.

(24) The master control program MCP 60 FIG. 3, causes an event which is monitored by MARC (with COMS as an intermediary) for its intercom queue and then inserts the response.

(25) This response is passed from the MCP 60 over to COMS 42 on behalf of MARC 40, FIG. 3.

(26) COMS transforms this response into a message format that MARC 40 can now decode.

(27) MARC detects an "event" has been caused which notifies it that an "unsolicited message" has arrived.

(28) MARC 40 examines the message and notes that the message, that has arrived, is a message response to a Kerberos command.

(29) MARC prepares to deliver the message by matching the TRANSACTION_ID over to a MARC Dialog Number. If the Dialog Number is still active and had previously initiated a Kerberos command, MARC puts the message in a displayable format for delivery. However if the Dialog Number is no longer active, the message is then discarded.

(30) MARC 40 then passes the message over to COMS 42 for actual delivery.

(31) COMS passes the messages to the networking software on the NX Server 13 (ix of FIG. 6A).

(32) The networking software on the NX Server then constructs a message using the appropriate transport protocol mechanism, such as Net BIOS, TCP/IP, and so on for transport to client 10.

(33) The incoming message is then processed on the client workstation 10.

(34) The user-operator sitting at the client workstation 10 is then notified that a message has arrived for his or her review.

FIGS. 6A and 6B show flow chart diagrams illustrating the operational steps of the processes involved in the location (f2) designated block "C" of FIG. 4. As seen in FIG. 6A, the Kerberos Support Library receives a request for service (i). Then the Kerberos Support Library notifies the Menu-Assisted Resource Control Program (MARC) that an "asynchronous" service is requested (ii). At branch 61, (FIGS. 6A and 7A) the MARC process notes the details of the client and "releases," at step (iii), the session. The "session" is used to denote the active connection between a user and a computer or between two computers. This provides an input back to the original requester 10 which then leaves the client free to initiate a new service request, step (v), thus to continue with further operations even though the service for the original request was not yet provided by the Kerberos Server 20.

Returning now to the FIG. 6A block designated (ii) where the KSL 34 notifies MARC 40 that an asynchronous service is requested. Now, the process cycle 62 (FIGS. 7A, 7B) occurs over at location step (vii), FIG. 6A, where the Kerberos Support Library builds a service request and stores the "client information". This then proceeds to location (viii) FIG. 6A at which the Kerberos Server 20 processes the service request. Then, at location (ix), here, the NX server 13 receives the asynchronous response after which at location (x) the Kerberos Support Library receives the message. An auxiliary operation can occur at location (x) where the path 63 indicates that the Kerberos Support Library then builds a message header at location (xii).

Then, at position (x), the Kerberos Support Library having received the message continues on to position (xi) designated as "PP" which continues as shown in FIG. 6B.

Figure 7A:
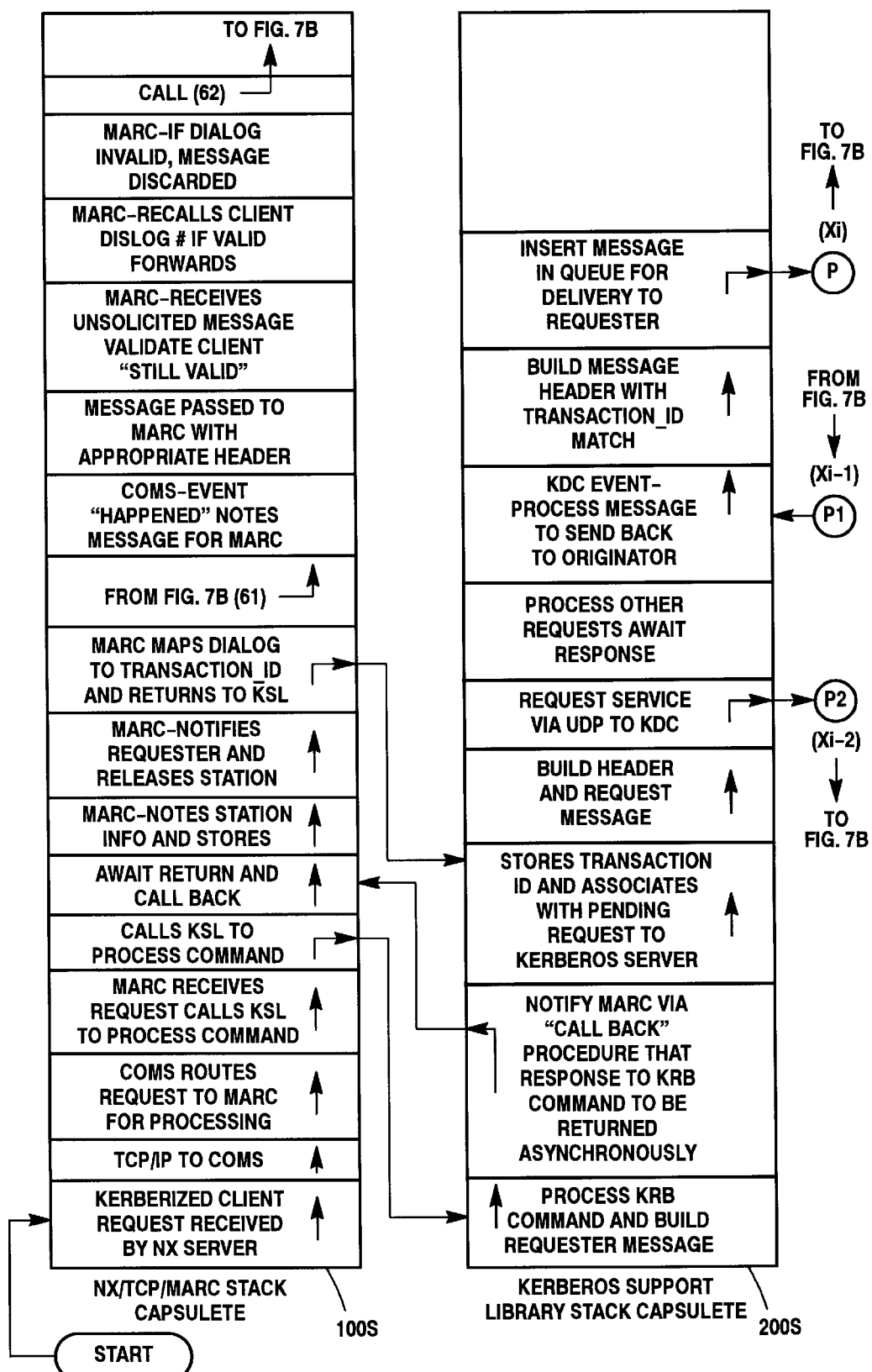
FIG. 7 on sheets 7A and 7B is a drawing illustrating a stack sequence operational chart showing the operations involved in providing a message for delivery to a requester.
Figure 7B:
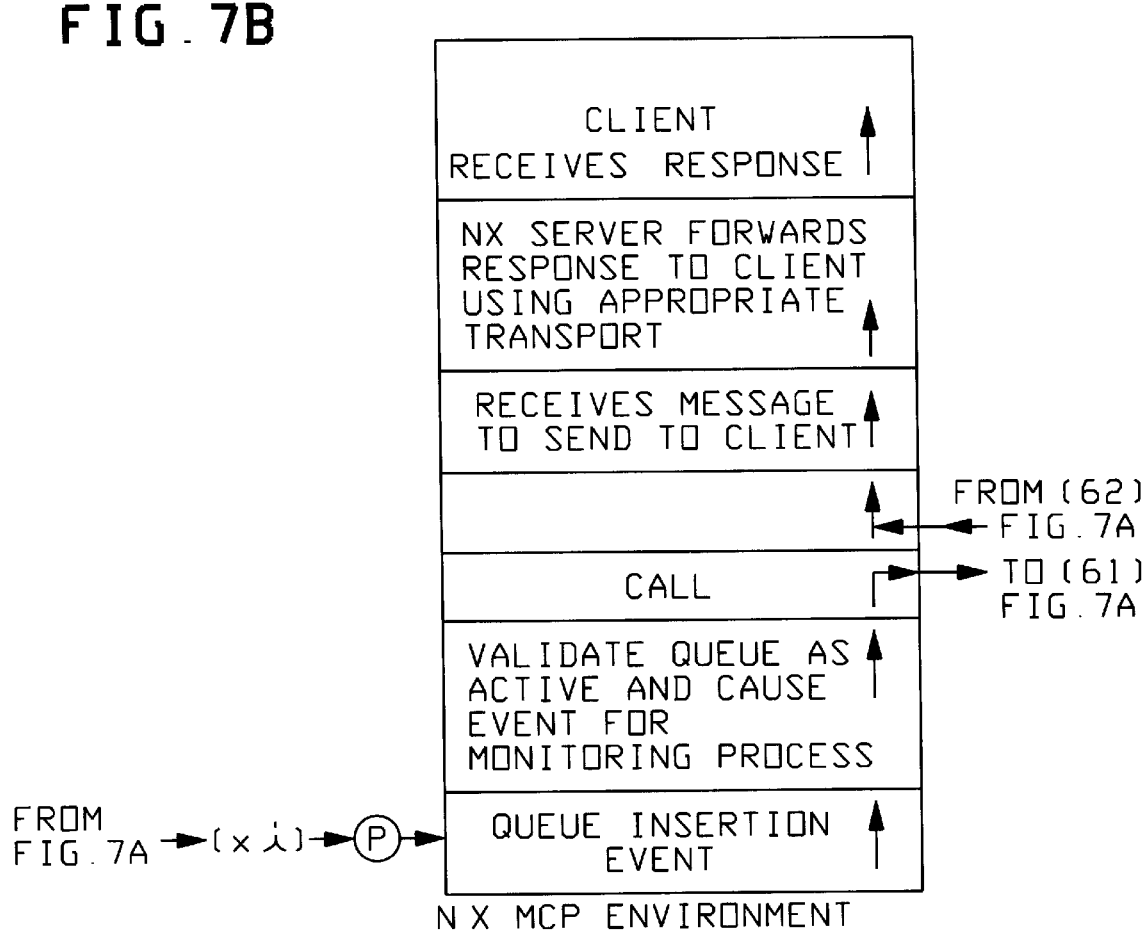
Figure 7B:
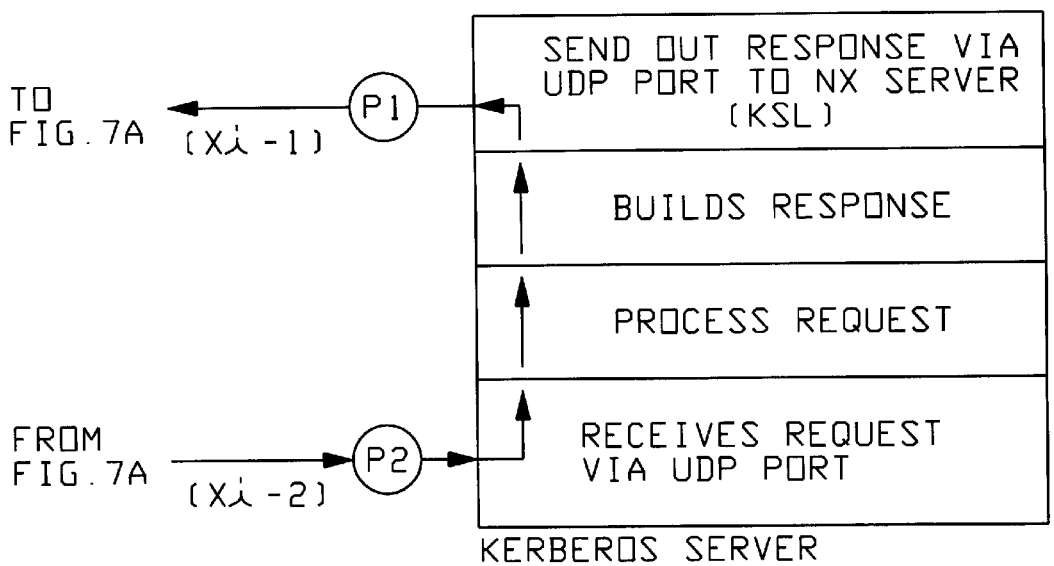

At position (xi) designated "P" of FIG. 6B, it is then necessary to refer to FIG. 7B which shows the Queue Insertion Event (at xi=P). Then, as shown in FIG. 6B at position (xiii), the Kerberos Support Library inserts a formatted message in the queue. The Kerberos Support Library 34 has built the message, that was received from the Kerberos Server, and placed it into a queue array, plus attaching in certain control information. The Kerberos Support Library (KSL) then "inserts" this message using an "insert construct" as provided by the DCALGOL programming language. When the "insert statement" is executed, then the MCP code will then be invoked.

Now referring to FIG. 6B, the process "P" continues at position (xi) over to the position (xiii) wherein the Kerberos Support Library inserts a formatted message in the queue (62, FIG. 3) and detailed in FIG. 10. Then, at position (xiv), the master control program (MCP) notes the queue event and passes the information onto COMS. In summary, and as a continuation from position (xi), the MCP code is invoked on top of the queue stack environment (at P of FIG. 7B) which will then process the "insert event statement". This code then takes the array (a structure containing the data or message), which is actually a data descriptor, and in combination, noting the source and the destination, then lays the groundwork to "notify" the destination. The COMS program is the interim destination. The Master Control Program "causes" an Event which the COMS environment has been monitoring. When this Event "happens", the COMS program now has visibility to the array (data descriptor), which will then be routed by another queue over to the MARC program, via 61 of FIG. 7B over to 61 of FIG. 7A. Thus it can be said that the MARC program receives the unsolicited message at position (xvi), FIG. 6B.

This processing function proceeds to position (xv) where COMS then notes the queue event and passes the message on to MARC. Then at position (xvi), the MARC process receives the unsolicited message in the control queue FIG. 10. At position (xvi), it is seen that the MARC program receives the unsolicited message in a queue.

An "Unsolicited Message" is a message generated by any software which will be ultimately displayed by another software which is not in a "wait" state (waiting) for said message to be delivered to it. The receiving software is not aware (programatically) that a message is being delivered. Conversely, a "Solicited Message" is a message generated by any software for which another software is waiting (the process environment is suspended) and the receiving software is aware that it will be receiving this message.

The process of "receives" is an instance again of moving data from one environment to another environment using a queue. The data descriptor which points to the data in an area of memory is passed from one process to a different process. The MARC program receives the MSG (data descriptor) from COMS, and then MARC will then process this message (xxi) i.e., convert to COMs Message format, which will ultimately be passed back to COMS for delivery shown at position (xxii). At position (xxii), it is seen that COMS receives the message to be delivered to the original requester. Here, COMS receives the message from MARC.

Then through a series of procedure calls, the message is eventually delivered to the appropriate transport for delivery at the original client-requester 10.

Then, along the communication channel 64 (FIG. 6B) to the position (xvii), here the MARC program processes the unsolicited message and also checks the present validity of the original request.

Thus, at position step (xviii), MARC verifies to see whether the original requester is still a valid requester, after which at position (xix), a check is made at the decision tree to determine whether the particular station is still valid. If the station is valid, Y=Yes, then at position (xx) a "valid return" signal is sent, location step (xvi), where MARC receives the unsolicited message in a control queue, at which time on channel 65, at position step (xxi), MARC converts the encoded station information into a COMS message format. This is sent via position (xxii) whereby COMS receives the message to be delivered to the original requester at the terminal 10.

FIGS. 7A and 7B are a set of drawings showing the stack of processes used in a sequential set of software operations. In FIG. 7A, the left-hand stack designated "100s" is marked as the NX/TCP/MARC stack capsulete. The stack "200s" on the right side of FIG. 7A is designated as the Kerberos Support Library stack capsulete. Sequential interconnections between stacks 100s and 200s are shown.

In FIG. 7B, the process stack designated NX MCP Environment is the sequence of processes which originate from the pointer P, location step (xi) coming from FIG. 7A.

The lower portion of FIG. 7B is the processor stack environment for the Kerberos server correlating the pointer P1 location step (xi-1) of FIG. 7A and also the pointer P2 location (xi-2) coming from FIG. 7A.

Referring to FIG. 7A, the stack capsulete 100s starts with the Kerberized client request received by the NX server 13. Then the transmission control protocol/internet protocol provides communication to the COMS software whereinafter the COMS routes the request to MARC for processing by the Kerberos Support Library to process the command. Then, a call is made to the Kerberos Support Library to process the command, after which there is a period for awaiting the return and a call-back. The call back process is the KSL informing MARC that this command will be processed asynchronously. In addition KSL requests several attributes (the MCS number and Transaction_ID) such that KSL may return this information for routing purposes to MARC when the final response is returned.

Since MARC can receive Unsolicited Message(s) from other software's like the Controller software, it is intended to show that the message MARC received is a message from KSL 34. There is a fine distinction between box (xvi) and (xvii) in FIG. 6B; in (xvi) MARC is receiving an unsolicited message from someone. In (xvii) MARC now knows it to be a Kerberos message from KSL 34.

The MARC program notes the station information and stores it in the information (Stack 100s, FIG. 7A). The MARC program notifies the requester and "releases" the station for other operations.

Now MARC maps the dialogue number to the Transaction_ID and returns the dialogue number to the Kerberos Support Library. This brings the process to (61) shown in stack 100s which correlates to FIG. 6A designated (61) between the step (ii) and step (iii).

Note that in stack 100s (FIG. 7A), there were several intermediate steps, such that the step involving "Calls Kerberos Support Library To Process Command", will be seen to communicate to the stack 200s whereupon there is a processing of the Kerberos command and the building of a requester message after which there is a notification to MARC via a "call back" procedure, such that the response to the Kerberos command is to be returned "asynchronously". This is then fed over to the first stack 100s at the block designated "Await Return And Call-Back". Subsequently at stack 100s at the function where MARC maps the dialogue number to the Transaction_ID and returns this data to the Kerberos Server Library, there is then a sequence over to the stack 200*s* (FIG. 7A) where the system stores the Transaction_ID and associates it with a pending request to the Kerberos server, after which the system builds a header and request message which then involves a request of service via the User Datagram Port (UDP) to the KDC (Key Distribution Center) 22, FIG. 2.

The request for service via the UDP to the KDC in stack 200*s* is seen at location (xi-2) "P2" which is further continued on FIG. 7B where the Kerberos server receives the request via the UDP port then processes the request and builds the response, then sends out the response via the UDP port to the NX server 13 which function is continued as "P1" which relates back to FIG. 7A at location (xi-1).

Here, at FIG. 7A, step (xi-1)=P1, there is a KDC event, such that the message is processed to send back to the originator. Then proceeding upward in stack 200*s*, the Kerberos Support Library will build the message header with a Transaction_ID match after which there will be an insertion of the message in the queue for delivery to the requester at location (xi) "P". Now referring to FIG. 7B, the NX_MCP environment shows the sequence at "P" (xi) which involves a queue insertion event, followed by an action to validate that the queue is active and to cause an "event" for monitoring the process.

Then, a call is made to (61) located on stack 100*s* (FIG. 7A) followed by the events shown on the upper part of stack 100*s*, where the COMS-event has "happened" and notes a message for MARC. Then, the message is passed to MARC with the appropriate header, after which MARC receives the unsolicited message. At this time, there is also a validation cycle to validate that the client is still valid. After this, MARC recalls the client dialogue number and if valid, forwards the dialogue number. If the dialogue number is invalid, then MARC will discard the message. This is followed by a call to position (62) of FIG. 7B whereby the client-server 13 is seen to transport the response to the client with a message as - - - "your password has been successfully changed".

Thus, in summary, the asynchronous service request from MARC designated as "process C" is seen in FIG. 6A so that now referring to FIG. 4, the client service request is being routed to the MARC whereby MARC requests for Kerberos service and the Kerberos Support Library receives the request for service (d1, FIG. 4), will then select the "asynchronous" message choice at (e) which will then trigger the process "C", location (f2) which is then instituted at FIG. 6A, together with FIG. 6B.

In FIG. 6A, a series of processes designated (61) operates between the moment that the Kerberos Support Library notifies MARC that an asynchronous service is requested and at the point (iii), FIG. 6A, where the MARC program notes the client's details and releases the session back to the original requester at terminal 10, after which the client is free to initiate a new service request even though the asynchronous service request has not yet been consummated.

However, subsequently, an unsolicited message will be generated by the Kerberos server and the MARC program in order to notify the client via an unsolicited message that he may proceed with his original request, since he has now been authenticated by the Kerberos Server.

Thus, the user-client can initiate a first or original request for service in a Kerberized environment and does not have to wait for a validation and completion of that original request before he can proceed to do other request operations. After receipt of an unsolicited response to this original request, the originating client-user operator can then pursue the original request.

FIGS. 8 and 9 were previously described under the heading of "GENERAL OVERVIEW".

While the present disclosure has described several variations for handling unsolicited messages from a Kerberos Server to a client, the instant invention is focused on the handling of synchronous response messages which are messages that can be independently handled by a single program (such as the MARC Program) without the need to access and use other outside programs to handle and transmit the response message to the client (as is required when the response message is "asynchronous").

What is claimed is:

1. In a network wherein multiple client terminals communicate with a client-server means having a Kerberos Support Library means (KSL) and also communicate with an associated Kerberos Server means, a method for enabling a requesting client terminal to receive a synchronous response message from said Kerberos Server means, comprising the steps of:

(a) initiating a synchronous co d request to said Kerberos Server means by a client-terminal via a Menu Assisted Resource Control (MARC) Program in said client server to a Communications Management System Program (COMS);

(b) transmitting, by said COMS Program, said synchronous command request to said Kerberos Support Library (KSL) means;

(c) requesting, by said Kerberos Support Library means, to said Kerberos Server means of a message response for delivery to said Kerberos Support Library means;

(d) generating, by said Kerberos Server means, a synchronous message response for transmittal to said Kerberos Support Library means;

(e) transmitting of an encoded message through utilization of a Generic Security Service unit, by said KSL, of said synchronous message response, sail response message acting as an unsolicited message which will not deter other client requests from being initiated, said encoded message being transmitted via said COMS Program, to said MARC Program for delivery to said requesting client-terminal.

2. In a Kerberos domain wherein a client terminal utilizes a Kerberos Server and client-server holding a Kerberos Support Library means (KSL) utilizing a General Security Services unit enabling selection of a variety of message encoding means to provide a secure synchronous message operation for response to said client terminal from said Kerberos Server, a method for executing said response operation for a synchronous message comprising the steps of:

(a) generating an original synchronous service request by said client-terminal;

(b) routing, said synchronous service request, via a Menu Assisted Resource Control Program (MARC) to a Comunication Management System Program (COMS);

(c) transmitting said request for service, by said COMS program, to a Kerberos Support Library means in said client-server;

(d) determining, by said Kerberos Support Library means, that said message request is synchronous;

(e) communicating, by said Kerberos Support Library means, to said Kerberos Server, that the response message is to be synchronous;

(f) processing said service request by said Kerberos Server;

(g) transmitting a Kerberos Server message response to said Kerberos Support Library means in said client-server;

(h) conveying said message response in an encoded message selected by said General Security Service unit, via said COMS program, from said Kerberos Support Library means to said MARC Program;

(i) delivering said synchronous message response to said client terminal by said MARC program without denying usage of said client terminal during the time period between initiation of said original client request and said message response.

3. A secure synchronous message transmission and response system in a Kerberos environment which permits a client-terminal to request service, from a Kerberos Server means, for a synchronous message response without suspending the client-terminal's service even though the Kerberos Server means has not yet responded to an earlier request for service, said system comprising:

(a) a client terminal means for requesting a synchronous message response from said Kerberos Server;

(b) program means for transmitting synchronous command requests to said Kerberos Server means via a Kerberos Support Library means in a client-server means;

(c) means for returning an encoded synchronous message response through utilization of a General Security Service-Application Program Interface (GSS-API) unit, which enables a variety of selected encodings to be chosen for the return message, to said client-terminal as an answer to said request of said client terminal means;

(d) Kerberos Server means for providing verification means as to the authenticity of each client terminal means;

(e) client-server means for holding said program means and including:

(d1) said Kerberos Support Library means including said General Security Service Application Program Interface unit permitting selection of different security mechanisms for encoding messages.

4. The system of claim 3 wherein said program means includes:

(a) a Menu Assisted Resource Control (MARC) Program for routing said synchronous request to a Communications Management System (COMS) Program;

(b) said COMS Program for requesting service from said Kerberos Support Library means and said Kerberos Server including;

(b1) means to transmit a synchronous response message from said Kerberos Support Library means to said client-terminal means without inhibiting the usability of said client-terminal.

\* \* \* \* \*